United States Patent
Masuzawa et al.

(10) Patent No.: US 8,039,998 B2
(45) Date of Patent: Oct. 18, 2011

(54) ROTOR FOR MOTOR AND METHOD FOR PRODUCING THE SAME

(75) Inventors: Masahiro Masuzawa, Fukaya (JP); Masahiro Mita, Fukaya (JP); Keiko Kikuti, Ageo (JP)

(73) Assignee: Hitachi Metals, Ltd., Tokyo (JP)

( * ) Notice: Subject to any disclaimer, the term of this patent is extended or adjusted under 35 U.S.C. 154(b) by 817 days.

(21) Appl. No.: 11/721,956

(22) PCT Filed: Dec. 19, 2005

(86) PCT No.: PCT/JP2005/023284
§ 371 (c)(1),
(2), (4) Date: Jun. 15, 2007

(87) PCT Pub. No.: WO2006/064948
PCT Pub. Date: Jun. 22, 2006

(65) Prior Publication Data
US 2008/0218007 A1    Sep. 11, 2008

(30) Foreign Application Priority Data

Dec. 17, 2004 (JP) ................. 2004-365955
Aug. 11, 2005 (JP) ................. 2005-232835

(51) Int. Cl.
*H02K 15/12* (2006.01)
(52) U.S. Cl. .................... 310/44; 310/156.43; 310/43
(58) Field of Classification Search .............. 310/44, 310/156.43, 43
See application file for complete search history.

(56) References Cited

U.S. PATENT DOCUMENTS

| | | | | |
|---|---|---|---|---|
| 3,694,115 A | * | 9/1972 | Steingroever | 425/78 |
| 3,891,879 A | * | 6/1975 | Yamada et al. | 310/163 |
| 4,322,666 A | * | 3/1982 | Muller | 318/400.41 |
| 4,604,042 A | * | 8/1986 | Tanigawa et al. | 425/3 |

(Continued)

FOREIGN PATENT DOCUMENTS

JP    05-326232    12/1993

(Continued)

OTHER PUBLICATIONS

Translation of Japanese Document JP 2000278919 A.*

*Primary Examiner* — Quyen Leung
*Assistant Examiner* — Alex W Mok
(74) *Attorney, Agent, or Firm* — Sughrue Mion, PLLC

(57) ABSTRACT

A surface magnet type rotor and an inner magnet type rotor having good motor characteristics in which bonding strength is high between a magnet section and a soft magnetic yoke section, and structural reliability is high even in high speed use, and its producing method. The rotor comprises an anisotropic bond magnet section and a soft magnetic section wherein the anisotropic bond magnet section is preformed in magnetic field and then formed to be integrated with the soft magnetic section in nonmagnetic field. Subsequently, it is heat hardened to produce a surface magnet type rotor. Magnet units, each having a magnetic pole composed by bonding a pair of permanent magnets such that the directions of magnetization become symmetric with respect to the bonding surface, are linked such that magnetic poles of different polarities appear alternately on the magnetic action surface thus forming an anisotropic magnet body. Good motor characteristics can be attained by setting an angle to 5-40° between the direction of magnetization of the permanent magnet and a diametral direction passing the bonding surface.

9 Claims, 18 Drawing Sheets

U.S. PATENT DOCUMENTS

| | | | |
|---|---|---|---|
| 5,298,826 A * | 3/1994 | Lee et al. | 310/156.09 |
| 5,331,237 A * | 7/1994 | Ichimura | 310/44 |
| 6,765,319 B1 * | 7/2004 | Thompson | 310/43 |
| 2002/0180295 A1 * | 12/2002 | Kaneda et al. | 310/156.43 |
| 2004/0046471 A1 * | 3/2004 | Kim et al. | 310/156.43 |
| 2004/0061582 A1 * | 4/2004 | Kondo et al. | 336/83 |
| 2004/0086412 A1 * | 5/2004 | Suzuki et al. | 419/19 |
| 2004/0222713 A1 * | 11/2004 | Sidey et al. | 310/156.43 |

FOREIGN PATENT DOCUMENTS

| | | | |
|---|---|---|---|
| JP | 07-169633 | | 7/1995 |
| JP | 11-186027 | | 7/1999 |
| JP | 2000-278919 A | | 10/2000 |
| JP | 2000-295797 A | | 10/2000 |
| JP | 2000348921 A | * | 12/2000 |
| JP | 2001-052921 A | | 2/2001 |
| JP | 2001-095185 A | | 4/2001 |
| JP | 2003-032931 A | | 1/2003 |
| JP | 2003045734 A | * | 2/2003 |
| JP | 2003217929 A | * | 7/2003 |
| JP | 2003-319620 A | | 11/2003 |
| JP | 2004-023085 A | | 1/2004 |
| JP | 2004-140951 A | | 5/2004 |
| JP | 2004-146542 A | | 5/2004 |
| JP | 2004-248496 A | | 9/2004 |
| JP | 2004-253697 A | | 9/2004 |
| JP | 2004253697 A | * | 9/2004 |
| JP | 2005152886 A | * | 6/2005 |

* cited by examiner (a)

(b)

(a)

(b)    (c)

(a)

(b)

ROTOR FOR MOTOR AND METHOD FOR PRODUCING THE SAME

TECHNICAL FIELD

The present invention relates to a bond magnet rotor for motors, which is integrated with a soft magnetic yoke and provided for the purpose of making motors, generators and so on with use of permanent magnets to have a high efficiency.

BACKGROUND ART

Conventionally, various structures of a bond magnet rotor of motors have been proposed, which are generally classified into two systems. A first system comprises a so-called surface permanent magnet (referred below to as SPM) rotor, in which permanent magnets are arranged on magnetic pole surfaces as shown in FIGS. 2(a) to 2(c) and 2(f). In contrast, a second system comprises an interior permanent magnet (referred below to as IPM) rotor, in which permanent magnets are arranged in a rotor as shown in FIGS. 2(d) and 2(e). The former SPM rotor is of a type, in which permanent magnets arranged on a rotor surface are opposed to a stator with an air gap therebetween, and which has characteristics in being easy in design and manufacture as compared with the latter IPM rotor. Also, the latter IPM rotor has characteristics in being excellent in structural reliability and easiness, with which reluctance torque is obtained. In addition, an epicyclic type magnet rotor shown in FIG. 2(f) adopts a SPM structure in many cases since there is less risk that magnets centrifugally depart from those base.

For permanent magnet rotors shown in FIG. 2, it is conventionally general to use an adhesive as a way to fix permanent magnets to a surface of, or in a soft magnetic yoke, which is formed from an insulating laminate of silicon steel sheet, casting, forging, or the like.

When a magnet rotor is assembled into a motor to be rotated, there are generated a centrifugal force upon rotation, and magnetic attraction and repulsion between the magnet rotor and a stator. There are also generated vibrations and so on upon rotation. Here, when bonding strength is insufficient between respective magnets and respective soft magnetic yokes, which form a rotor, and between the magnets and the soft magnetic yokes, exfoliation and breakage of the magnets are caused. Since a centrifugal force is increased in substantially proportion to a second power of a rotating speed, such problem becomes serious with high speed rotation. The problem is conspicuous in the case where segment magnets are used as shown in FIG. 2, in particular, in a hypocyclic type SPM rotor, in which magnets are arranged on an outside diametric portion of the rotor as shown in FIGS. 2(a) to 2(c). Further, even in case of using a ring magnet being a single magnet capable of forming a plurality of magnetic poles, a clearance on an adhesive layer is enlarged and a further soft adhesive is used in many cases with a view to avoiding breakage of the magnet due to a difference in coefficient of linear expansion between the magnet and a soft magnetic yoke when a rotor is varied in temperature. In addition, the clearance on the adhesive layer is responsible for an increased dispersion in bonding strength and deviation of positions of bonding. Also, a soft adhesive is generally poor in thermal stability and bonding force. In this manner, there are many technical problems in a bonding work of a magnet rotor irrespective of a shape of a magnet.

From a concern about bonding strength set forth above, as a measure to strength of a hypocyclic type SPM rotor, a protective ring 3 for structural reinforcement, which is made of nonmagnetic stainless steel, fiber reinforced plastic and so on, is in many cases fitted on outer peripheral surfaces of magnets 101 to make up for strength. In such case, however, an effective air gap widens to make magnetic flux from the magnets hard to reach a stator, so that motor output is decreased. Further, a protective ring made of metal such as stainless steel, etc. generates an eddy current loss to lead to a decrease in motor efficiency. In addition, it is apparent that no sufficient bonding strength is obtained between magnets and a soft magnetic yoke since use of a frame and a protective ring for structural reinforcement is premised in JP-A-2001-95185 (Patent Document 1) and JP-A-2003-32931 (Patent Document 2) listed as comparative examples, in which magnets and a soft magnetic yoke are formed integrally. Also, since a ring magnet is wedge-shaped to bite into a yoke owing to macroscopic, outward appearance and shape of the magnet to prevent coming-off from the soft magnetic yoke in JP-A-5-326232 (Patent Document 3) and a magnet is limited to a ring shape in JP-A-7-169633 (Patent Document 4), it is apparent from descriptions regarding a manufacturing method that no sufficient bonding strength is obtained between a magnet and a soft magnetic yoke and the soft magnetic yoke is held only by inner pressure in a ring magnet. In JP-A-2001-052921 (Patent Document 5), temporarily forming under compression and main forming are performed to form a ring-shaped magnet. However, the ring-shaped magnet and a soft magnetic yoke are bonded together by adhesion to be insufficient in bonding strength and reliability.

By the way, permanent magnets include two types of isotropic and anisotropic ones. Isotropic magnets are 20% lower in magnetic properties than anisotropic magnets but have a character that manufacture is easy since there is no need of giving any magnetic field in a process of compression-forming magnetic powder. On the other hand, by charging raw material powder, which possesses axes of easy magnetization and is put in nonmagnetized state, into a metallic die, giving thereto a strong magnetic field in a suitable way to arrange the axes of easy magnetization in a specified direction, and compression-forming in an intact state and sintering, or hardening with a thermosetting resin, an anisotropic magnet is little changed in properties and functions as a permanent magnet. Here, with an anisotropic bond magnet of ferrite or rare-earth, after a raw material is pulverized, magnetic powder 6 is formed under compression in a metallic die, to which a magnetic field is applied as shown in FIG. 4 (arrows A in the drawing indicate a pressing direction). Thereby, from the magnetized magnetic powder 6, powder magnets having magnetic poles N, S along an axis of easy magnetization are produced so as to be generally in conformity with an external magnetic field like a compass needle. When forming under compression is performed in this state, a green compact with aligned axes of easy magnetization is resulted. In addition, an anisotropic magnet is subjected to demagnetization treatment by application of a backing field, or an alternating attenuation magnetic field in the last process of forming in a magnetic field. The green compact is beforehand mixed with a thermosetting resin and subjected to heat curing to be made a bond magnet. A magnet with axes of easy magnetization arranged in this manner is said to be an anisotropic magnet. For an anisotropic magnet, excellent, magnetic properties are obtained only in a direction, in which axes of easy magnetization are aligned.

Patent Document 1: JP-A-2001-95185
Patent Document 2: JP-A-2003-32931
Patent Document 3: JP-A-5-326232
Patent Document 4: JP-A-7-169633
Patent Document 5: JP-A-2001-052921

DISCLOSURE OF THE INVENTION

Problems to be Solved by the Invention

Large energy is required to provide a permanent magnet with such magnetism. For example, oriented magnetic field strength in the order of 1600 kA/m is needed for a rare-earth bond magnet including NdFeB. In a system, in which direct current flows through an electromagnet, the magnetic field strength set forth above is obtained in the case where it is spatially possible to wind a coil many times, but only a magnetic field in the order of 800 kA/m can be usually generated due to restrictions on coil heating in the case where a coil can be wound small times. Here, a system, in which large current of high-voltage charged in a capacitor is caused to momentarily (pulsed manner) flow, is generally used for a magnet, which needs a high magnetic field of not lower than 1600 kA/m. Also, since such large current is caused to flow, a coil section generates a large quantity of heat, so that it is necessary to add a forced air cooling or forced water cooling mechanism to prevent conductor dielectric breakdown due to heat generated from a coil section.

Figure 4:
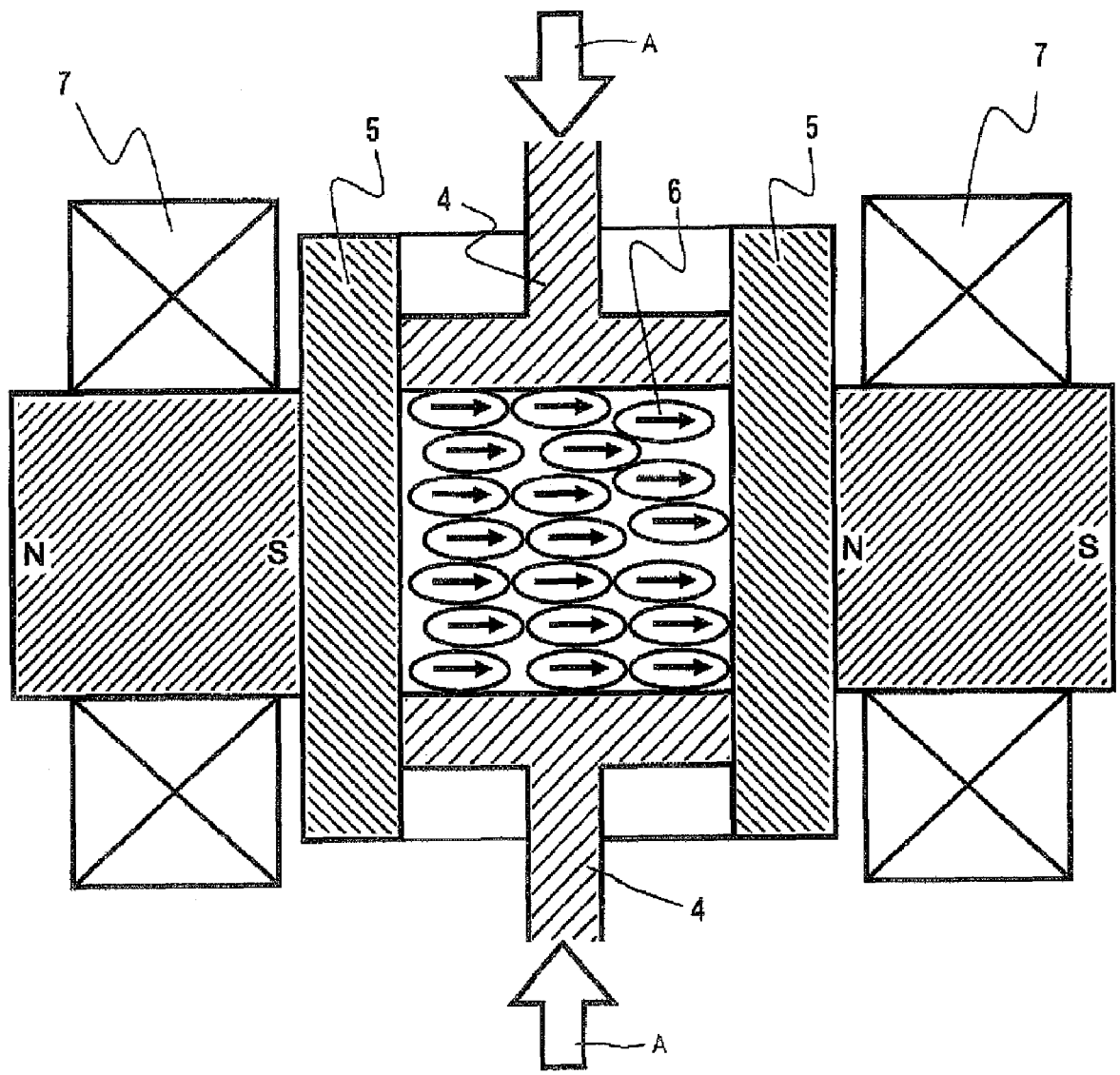
FIG. 4 is a cross sectional view illustrating the principle of forming in a magnetic field.
Figure 5:
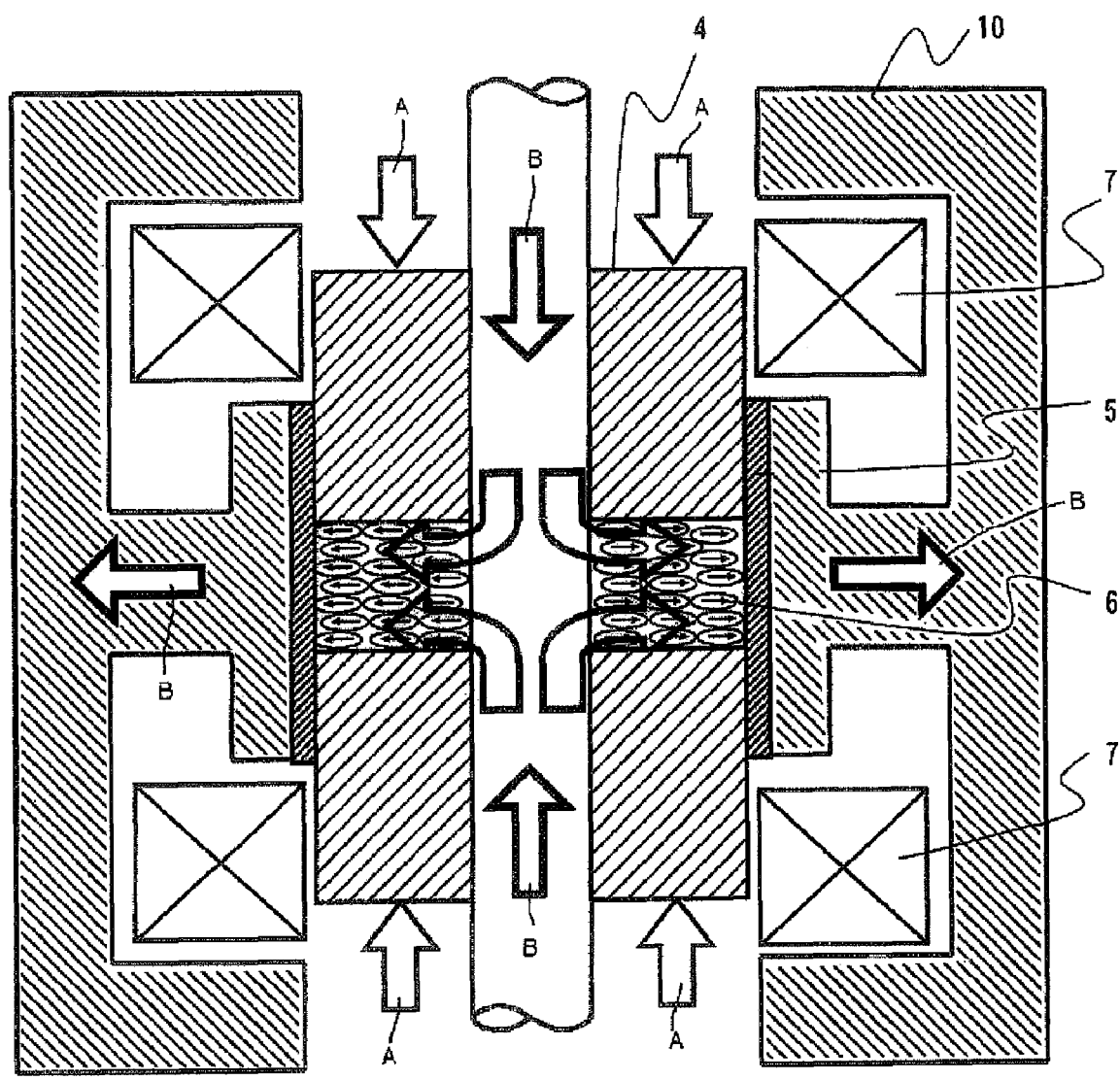
FIG. 5 is a cross sectional view schematically illustrating a method of manufacturing a radially anisotropic orientation type ring magnet in a conventional system.

In the case where a simple rectangular parallelepiped magnet is to be oriented (magnetized) in a longitudinal direction, orientation can be readily achieved at the time of forming under compression as shown in FIG. 4. In the case where multiple magnetic poles such as N, S, N, S are to be oriented radially on a ring-shaped magnet, however, it is necessary to first use an exclusive apparatus as shown in FIG. 5 (in the drawing, arrows A indicate a direction of pressing and thick arrows B indicate a magnetic field direction) to perform compression-forming in a magnetic field to radially arrange axes of easy magnetization of a magnet. FIG. 5 is a vertical, cross sectional view showing a magnetic field forming apparatus for radial orientation. Also, with polar anisotropic orientation of magnetic poles for a ring-shaped magnet, it is likewise necessary to use a coil magnetic field shown in FIG. 6(a) (in the drawing, arrows B indicate a direction of magnetization) to make orientation and magnetization corresponding to the number of magnetic poles. FIG. 6(a) is a transverse, cross sectional view showing a magnetic field forming apparatus for polar anisotropic orientation of four magnetic poles.

In FIG. 5, magnetic fields from electromagnets arranged up and down are collected at a center of a yoke as indicated by gray arrows to spread radially outwardly in a magnet position. At this time, it is desired that as an oriented magnetic field, a magnetic field of a sufficient intensity be evenly distributed in a magnet position. For example, it is not desired that the intensity of an oriented magnetic field be poor in the vicinity of upper and lower end surfaces as compared with that near to a center in an axial direction of a ring-shaped magnet, and radial components be disordered in the vicinity of upper and lower end surfaces of a magnet.

In order to obtain such an ideally oriented magnetic field, it is desired that electromagnets be arranged as near to a magnet as possible to generate an intense, magnetic field, and a magnetic path surrounding the electromagnets be formed by a magnetic body, which is as high in saturation magnetic flux density as possible and high in relative permeability, and be made a closed, magnetic path. However, the both matters are in many cases difficult to realize due to restrictions in manufacture. For example, electromagnets can not help being arranged avoiding a piping through which a magnetic powder is supplied, another piping for cooling a coil, etc., and electromagnets are kept at a further distance by a clearance between them and a press-forming punch, which is a moving part.

On the other hand, a magnetic circuit including a metallic die, which surrounds electromagnets, is structured to be far different from a closed, magnetic path due to the need for a magnet taking-out opening. Also, for a material of a metal mold, mechanical strength cannot but have preference to magnetic properties so that the material can endure high pressure at the time of compression-forming. Further, according to dimensions of a magnet, magnetic saturation of a magnetic circuit including a metallic die, which surrounds electromagnets, imposes restrictions, so that a desired magnetic field cannot be obtained even a large amount of current is caused to flow. For example, as a magnet is decreased in inside diameter, magnetic saturation at a yoke tip end imposes restrictions, so that a sufficient oriented magnetic field is not obtained and orientation in a desired direction is made difficult. Also, for electromagnets of polar anisotropic orientation, shown in FIG. 6(a), since it is difficult as described above to wind a coil many times, it is hard to ensure a desired intensity for an oriented magnetic field and it is difficult to evenly generate a plurality of magnetic fields, so that dispersion in magnetic field distribution remains as hysteresis in a magnet, which is magnetized and oriented, to be responsible for generation of a magnet, which is increased in pole Fitch and dispersion of magnetic intensity.

Figure 6:
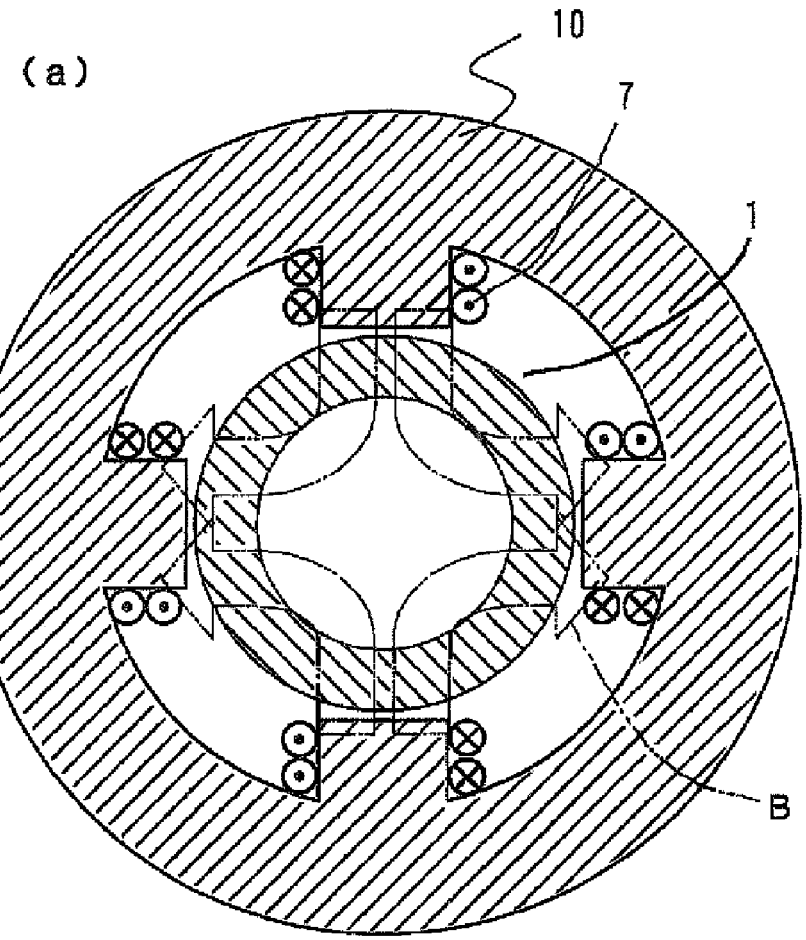
FIG. 6 is a cross sectional view (a) schematically illustrating a method of polarizing a polar anisotropic orientation type ring magnet, and the principles of polarization (b) of a radially anisotropic orientation type ring magnet and polarization (c) of a polar anisotropic orientation type ring magnet.
Figure 6:
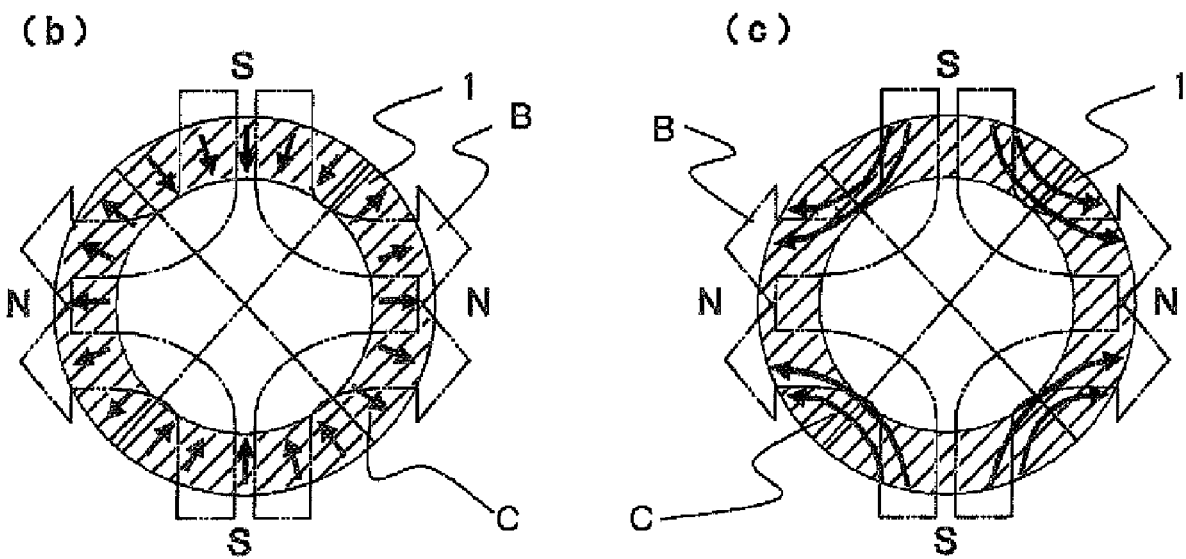

A polarizing apparatus having the same structure as that of the forming apparatus shown in FIG. 6(a) is used to enable NS polarization of a desired number of magnetic poles. After the apparatus shown in FIG. 5 is used to harden a formed body, axes of easy magnetization of which are radially arranged, with a thermosetting resin, an electromagnet, round which a coil corresponding to a desired number of poles (four poles in FIG. 6) is wound and which has the same structure as that shown in FIG. 6(a), is used to add a magnetic field as indicated by gray arrows. As indicated by arrows in FIG. 6(b) (In the drawing, arrows B indicate directions of magnetic fields and arrows C indicate directions of polarization), four magnetic poles polarized in a diametric direction can be formed on a formed body. After the apparatus shown in FIG. 6(a) is used to harden a formed body, axes of easy magnetization of which are aligned in polar directions, with a thermosetting resin, an electromagnet, round which a coil corresponding to a desired number of poles (four poles in FIG. 6) is wound and which has the same structure as that shown in FIG. 6(a), is used to add magnetic fields as indicated by gray arrows. As indicated by arrows in FIG. 6(c) (in the drawing, arrows B indicate directions of magnetic fields and arrows C indicate directions of polarization), four magnetic poles polarized in a diametric direction can be formed on a formed body. A radially oriented magnet and a polar, anisotropically oriented magnet are different in pattern of polarization from each other since they are polarized along a direction, in which a formed body is oriented, although polarized magnetic fields as added are the same in them.

In a process of polarization, it is necessary like a process of magnetization and orientation to adopt a pulse electric source and to take a cooling measure to heat generation of a coil. On the other hand, because of spatial restrictions, the more magnetic poles, the less the number of turns of a coil, so that it becomes difficult to obtain a sufficient polarization magnetic field. Further, since it is almost impassible to differently orient axes of easy magnetization, which are arranged in a forming process in a magnetic field, in a process of polarization, the process of orientation is more important than the process of polarization in order to obtain a magnetic rotor, which is small in pole pitch and dispersion of magnetic intensity. Because of the reason set forth above, however, it is extremely difficult to arrange axes of easy magnetization as an anisotropic magnet rotor at a time whether radial orientation or multipolar orientation is concerned.

In view of the problems set forth above, it is an object of the invention to provide rotors of a surface permanent magnet type and an interior permanent magnet type, in which a bond magnet section and a soft magnetic yoke section are high in bonding strength and which are high in safety of strength when used in high speed rotation, and a manufacturing method thereof. Also, it is an object of the invention to provide a method of manufacturing a permanent magnet, for which it is easy to perform orientation and polarization, which are stable and small in disarrangement irrespective of the number of magnetic poles, dimensions and a shape of the magnet, and in which it is possible to realize not only radial and polar anisotropic patterns but also a complex magnetic pole pattern, in which one magnetic pole is substantially parallel up to both ends.

Means for Solving the Problems

A first invention of the present application relates to a bond magnet rotor for a motor, being integral with a soft magnetic yoke, the bond magnet rotor comprising a bond magnet section formed from a magnet powder, which contains a binder agent, and a soft magnetic yoke section formed from a soft magnetic powder, which contains a binder agent, and wherein the bond magnet section and the soft magnetic yoke section are integrally subjected to forming under compression while the magnet powder and the soft magnetic powder engage with each other on a bonding interface. That is, a rotor of a motor, in which a bond magnet and a soft magnetic yoke are made integral, is provided by integrally pressure-forming a kneaded product of a ferrite magnet and/or a rare-earth magnet and a thermosetting resin, and a kneaded product of a high, magnetic permeability, soft magnetic material, such as atomized iron powder, Fe—Co alloy powder, nanocrystal powder, etc. and a thermosetting resin to thereafter apply hardening treatment on the same.

In the invention, it is possible to adopt a structure, in which the bond magnet section and/or the soft magnetic yoke section is formed from a plurality of portions.

It is desirable to use an isotropic and/or anisotropic rare-earth bond magnet for the bond magnet section. In order to obtain high, magnetic properties, it is desirable to use an anisotropic bond magnet. Also, the invention is not limited to a rotary type motor but applicable to general parts for a magnetic circuit, such as linear actuator, magnetic sensor, speaker, etc., in which a magnet and a soft magnetic yoke are used in combination. Further, a magnetic circuit can also be formed by using non-magnetic compound, which is obtained by mixing a binding material with non-magnetic powder of Cu, etc., for a part of, or a whole of a non-magnetic section.

In the invention, preferably, a rotor of a motor comprises an anisotropic bond magnet, which has magnetic anisotropy and is composed mainly of a magnet powder and a binder agent, and a soft magnetic section composed mainly of a soft magnetic powder and a binder agent, the respective bond magnets being integrated by compression-forming means to be made substantially columnar in shape, and the anisotropic bond magnet section oriented substantially in parallel being linked and formed so that magnetic poles of different polarities appear alternately on a magnetic action surface.

In the invention, preferably, magnet units constituted so that a plurality of permanent magnets oriented in parallel magnetic fields are combined to form a single magnetic pole are linked so that magnetic poles of different polarities appear alternately on a magnetic action surface.

In the invention, preferably, an anisotropic permanent magnet is formed by linking magnet units, each having a magnetic pole composed by bonding a pair of permanent magnets so as to make directions of magnetization thereof symmetric with respect to a bonding interface so that magnetic poles of different polarities appear alternately on a magnetic action surface, and each of the directions of magnetization of the permanent magnets has an inclination to a diametric direction passing through the bonding interface. The inclination is preferably an angle of 5 to 35°, more preferably 20°±10°.

Preferably, the magnet powder has an average particle size of 50 to 200 μm and the soft magnetic powder has an average particle size of 1 to 100 μm. The bond magnet section and the soft magnetic section are increased in bonding strength by making the both different in particle size, and it is possible to manufacture a rotor, in which void, crack, etc. can be suppressed. The magnet powder more preferably has an average particle size of 80 to 150 μm and the soft magnetic powder more preferably has an average particle size of 5 to 50 μm.

Magnet powder is desirably composed of anisotropic R—Fe—B system magnet powder or Sm—Fe—N system magnet powder. For example, when the residual magnetic flux density Br is less than 0.4 T as in a ferrite bond magnet, it is not possible to obtain a sufficient torque needed for a motor. Accordingly, it is further desirable to use a rare-earth bond magnet, in which Br≧0.8 T and a coercive force Hcj≧600 kA/m.

On the other hand, it is desirable to use an atomized iron powder, an iron powder of Fe—Co, a nanocrystal magnetic Fe-based powder, etc. to provide an electrical conductivity of not more than 20 kS/m, and magnetic properties of a saturation magnetic flux density Bm≧1.4 T and a coercive force Hc≦800 A/m. When the electrical conductivity is not more than 20 kS/m, it is possible to reduce an eddy current loss substantially equally to an insulating laminate of silicon steel sheet, etc. used as a soft magnetic yoke in conventional bonding system. Also, when Bm is low, a sufficient magnetic flux is not obtained and there is generated a need of making a yoke extremely large in size. In particular, in case of using a rare-earth bond magnet of Br≧0.8 T as in the invention, such problem is actualized. Also, when Hc is too high, a hysteresis loss upon rotation of a motor becomes conspicuous to lead to a considerable decrease in motor efficiency.

From the viewpoint of productivity and accuracy in assembly, various techniques for integrated forming of a magnet and a soft magnetic yoke have been developed while it is necessary in insert forming (Patent Document 1) to mix a large amount of resin with a magnet material and a soft magnetic material because a high fluidity is demanded of materials in terms of preparation. Therefore, a magnet material and a soft magnetic material amount to around 60 mass %, so that an advantage of light weight is provided but only low magnetic properties can be obtained. On the other hand, the invention has a feature in obtaining further high, magnetic properties since a soft magnetic material can amount to around 98 mass % because of forming under compression.

Also, it is preferable to coat soft magnetic powder with an insulating film. Alternatively, it is preferable to coat rare-earth magnet powder with an insulating film. Coating of an insulating film is applied to achieve an increase in electric resistance to enable decreasing an eddy current loss upon rotation of a motor.

As a raw material for forming of a magnet rotor, in which a bond magnet and a soft magnetic yoke are integrated together, resin binder (binder agent) is added to the magnet powder and the soft magnetic powder. A binder agent desirably contains 1 to 5 mass % of a thermosetting resin for a magnet powder compound and 0.1 to 3 mass % of a thermosetting resin for a soft magnetic powder compound. A binder agent is desirably a thermosetting resin. It is possible to appropriately use epoxy resin, phenolic resin, urea resin, melamine resin, polyester resin, etc. Content of a binder agent is preferably 0.1 to 5 mass % relative to the mass of magnet powder and 1.0 to 4 mass % is more preferable. Content of a binder agent is preferably 0.1 to 3 mass % relative to soft magnetic powder and 0.5 to 2 mass % is more preferable. When a binder agent is too small in content, the mechanical strength is considerably lowered, and when a binder agent is too large in content, the magnetic properties are considerably lowered.

Soft magnetic powder and a binder agent, or magnet powder (in particular, rare-earth magnet powder) and a binder agent are blended to make a compound. The compound may contain an antioxidant and a lubricant. The antioxidant prevents oxidation of magnet powder to contribute to prevention of a decrease in magnetic properties of a magnet. Also, the antioxidant contributes to an improvement in thermal stability when the compound is kneaded and formed, so that a good formability is preserved with a small amount of a binder agent. The antioxidant can use a known one such as chelating agent, which generates a chelate compound of tocopherol, amine compound, amino acid compound, nitrocarboxylic acid group, hydrazine compound, cyan compound, hydrosulphide, etc. for metal ion, in particular, Fe component, etc.

The lubricant makes it possible to obtain an equivalent property with a less addition of a binder agent in order to improve the fluidity of the compound when kneaded and formed. The lubricant can use a known one such as stearic acid or its metal salt, fatty acid, silicone oil, various kinds of wax, fatty acid, etc.

Also, addition of various additive agents such as stabilizing agent, auxiliary agent of forming, etc. is possible. The compound is mixed with use of a mixer, or an agitator.

A second invention of the present application relates to a method of manufacturing a component of a magnetic circuit, which comprises an anisotropic bond magnet section and a soft magnetic section, the method comprising:

preforming the anisotropic bond magnet section in a magnetic field by the use of a magnet powder compound composed mainly of a binder agent and a magnet powder;

main-forming the anisotropic bond magnet section so as to integrate the same with a soft magnetic powder compound composed mainly of a soft magnetic powder in nonmagnetic field; and heating the formed material for curing.

A third invention of the present application relates to a method of manufacturing a component of a magnetic circuit, the method comprising:

preforming a magnet powder containing a binder agent to fabricate a preformed body;

charging the preformed body and a soft magnetic powder containing a binder agent into a die cavity; and compression-forming the preformed body and the soft magnetic powder in a direction parallel to a boundary surface under higher forming pressure than preforming pressure, on which boundary surface the preformed body and the soft magnetic powder contact with each other.

A fourth invention of the present application relates to a method of manufacturing a component of a magnetic circuit, the method comprising:

preforming soft magnetic powder, which contains a binder agent, to fabricate a preformed body;

charging the preformed body and magnetic powder, which contains a binder agent, into a die cavity; and compression-forming the preformed body and the magnetic powder in a direction parallel to a boundary surface under higher forming pressure than preforming pressure, on which boundary surface the preformed body and the magnetic powder contact with each other.

Figure 7:
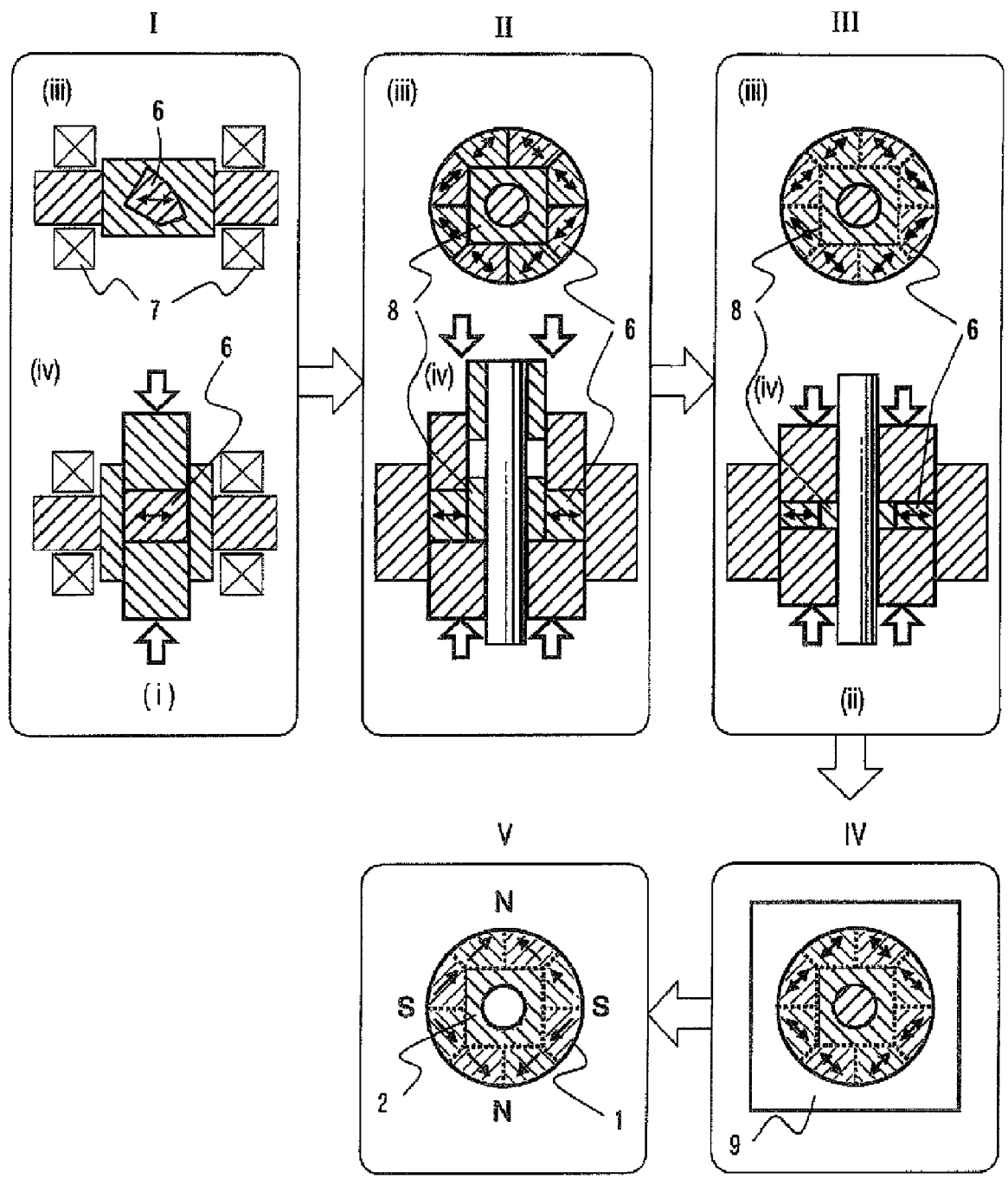
FIG. 7 is a view illustrating flow of a method of manufacturing a rotor in the invention.

Here, integral forming means for a bond magnet and a soft magnetic yoke will be described in detail with reference to FIG. 7 (in the drawing, I denotes a magnet preforming process, II a preformed body assembling process, III an integral forming process, IV a heat curing process, V a polarizing process, (i) preforming in a magnetic field, and (ii) main forming in nonmagnetic field, respectively. (iii) shows a plan view and (iv) shows a side view). A magnet powder compound composed of a binder agent and a magnet powder having an average particle size of 50 to 200 µm is charged into a compression-forming apparatus used exclusively for magnet preforming and preforming is performed at forming pressure of 200 to 400 MPa. The reason why forming pressure is decreased in preforming is that it is intended for increasing adhesiveness between magnet powder and soft magnetic powder at the time of main forming. In addition, in the case where a bond magnet is anisotropic, preforming is performed while a magnetic field is given by an electromagnet, etc.

Subsequently, preformed bodies for a plurality of bond magnets are assembled in a cylindrical die cavity, soft magnetic powder compound composed mainly of a binder agent and a powder of a soft magnetic material having a high, magnetic permeability and an average particle size of 1 to 100 µm, such as an atomized iron powder, a Fe—Co alloy powder, a nanocrystal powder, is supplied, a bond magnet section and a soft magnetic yoke section are integrally subjected to main forming simultaneously at forming pressure of 600 to 1000 MPa higher than preforming pressure. The reason why forming pressure is decreased in preforming is that it is intended for increasing adhesiveness between magnet powder and soft magnetic powder at the time of main forming. When preformed bodies charged in the cylindrical die cavity and magnetic powder or soft magnetic powder supplied later into the die cavity are pressurized in a direction parallel to a boundary surface, which the preformed bodies and the powder contact with each other to form, at higher forming pressure higher than the preforming pressure, the both are compressed simultaneously, so that the boundary surface is decreased in area. At this time, particles, which constitute the preformed bodies, and particles, which are supplied later into the die cavity, mutually enter into mating regions on the boundary surface, and the boundary surface is shaped in cross section to have irregularities. Mechanical bonding on the boundary surface is adequately achieved by the irregularities. The larger the irregularities on the boundary surface, the larger the mechanical bonding strength. In addition, the soft magnetic yoke section may be beforehand preformed at low pressure and main forming is performed after preformed bodies of bond magnets and a soft magnetic yoke are combined in the die cavity. Further, a binder agent, an adhesive, etc. may be beforehand applied on bonding interfaces of preformed bodies. Hot setting treatment performed after main forming causes the binder agent or the adhesive to melt to permeate the bond magnet section and the soft magnetic yoke section to reinforce the bonding interface.

Figure 18:
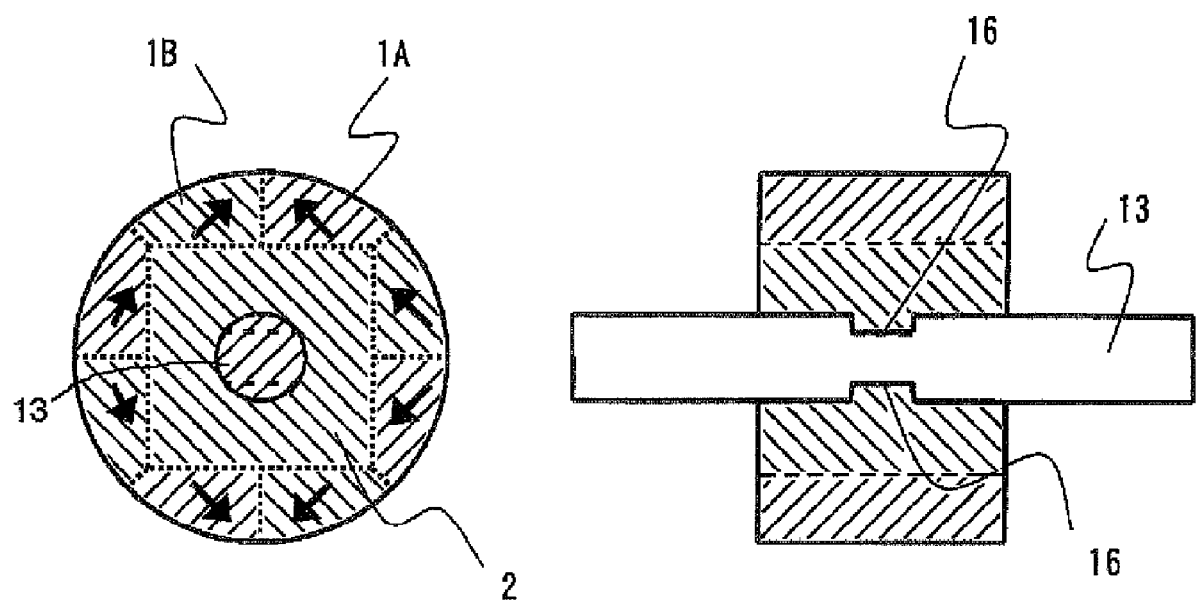
FIG. 18 is a cross sectional view schematically showing integration with a motor rotating shaft according to a further embodiment of the invention.

Also, when upper and lower punches for the bond magnet section and the soft magnetic yoke section are made movable separately, simultaneous pressurization is made possible without having punch contact surfaces of preformed bodies getting out of shape. In addition, curing treatment is performed at not higher than 250° C. after integral forming, surface treatment such as coating of epoxy resin, etc. is further applied at need, a rotating shaft is press fitted or adhesively fixed, and magnetic poles are finally polarized to provide a magnet rotor. Also, as shown in FIG. 18, it is also possible to beforehand set a motor rotating shaft 13 having flat surfaces 16 in a cavity of a main forming die to integrate the motor rotating shaft and a magnet rotor together. Also, when a motor shaft is long, it is possible to stack and use a plurality of magnet rotors. Further, stacking while shifting the pole pitch makes it easy to provide a skew angle.

A bonding strength between a bond magnet section and a soft magnetic yoke section can be increased by separately performing preforming and main forming to effect forming. This is because a magnet powder having a large particle size is first preformed whereby a part of a later charged soft magnetic powder having a small particle size engages with a side of the bond magnet section to increase the pressing force. With bonding by means of a conventional adhesive, an adhesion layer involves dispersion in thickness and a change in adhesive strength is caused according to a state of a bonding interface, so that it is difficult to obtain a stable adhesive strength. Even when an adhesive having an adhesive strength of 20 MPa or more is used, only a bond area in the order of ⅓ can be ensured, and so an adhesive strength of not more than 5 MPa in average is substantially obtained in many cases. In contrast, according to the invention, a pressing force between a bond magnet section and a soft magnetic section is ensured over a whole region of a bonding interface, so that it stably results at all times in a shearing stress of not less than 10 MPa, and further not less than 15 MPa. When exciting current is fed to a stator coil, torque is generated in a rotor. At this time, rotation is generated in a rotor while shearing stress is mainly applied to a bonding interface between a bond magnet section and a soft magnetic yoke section. As a rotating speed increases, tensile stress is also exerted on the bonding interface. The bonding interface formed according to the invention has a substantially equal strength for both shearing stress and tensile stress. In the case where the invention is applied to a motor rotor to be embodied, it is estimated that a large shearing stress is applied to a bonding interface in many cases, and so shear strength of the bonding interface is made an index for bonding strength in an embodiment described later.

Here, FIG. 11(a) (in FIG. 11(a), i denotes shear strength of a bonding interface between an isotropic bond magnet and a soft magnetic yoke) shows the correlation between preforming pressure and shear strength of the bonding interface when preforming pressure on isotropic bond magnet powder is changed in 200 to 600 MPa and main forming pressure after the powder is combined with soft magnetic powder under respective conditions is made 600 MPa. It is seen from FIG. 11(a) that the lower preforming pressure on the isotropic bond magnet, the higher shear strength of a bonding interface 110 after combined with soft magnetic powder to effect integral forming. This is because the lower preforming pressure, the larger a compression width in main forming, so that bond magnet powder and soft magnetic powder are liable to bite each other on the bonding interface at the time of compression. In addition, when preforming pressure is 200 MPa or less, a preformed body cannot be maintained in shape, so that productivity is considerably lowered. Since a magnet section is isotropic in residual magnetic flux density, it does not correlate to preforming pressure.

Subsequently, FIG. 11(b) (In FIG. 11(b), ii denotes shear strength of a bonding interface between an anisotropic bond magnet and a soft magnetic yoke and iii denotes Br(%) of the anisotropic bond magnet) shows the correlation between preforming pressure and shear strength of the bonding interface, and the residual magnetic flux density of a magnet section when preforming pressure on an anisotropic bond magnet is changed in 200 to 600 MPa and main forming pressure after it is combined with soft magnetic powder under respective conditions is made 600 MPa. As shown in FIG. 7, since a magnetic field is not given in a process of integral forming and the lower preforming pressure, the larger a compression width in main forming, it is thought that the lower preforming pressure, the more liable the orientation of a magnet given at the time of preforming to disarrange in main forming, and a decrease in residual magnetic flux density is resulted. Accordingly, when an anisotropic bond magnet is subjected to preforming in a magnetic field and main forming in a nonmagnetic field, it is preferred from the viewpoint of compatibility of a magnet between magnetic properties and bonding force that preforming pressure be in the range of 250 to 500 MPa and further desirably in the order of 300 to 400 MPa. Measurement of shear strength can be made from shearing stress and an area of a bonding interface when shearing stress in parallel to the bonding interface and in the same direction as a direction of compression at the time of main forming is applied on a region, which includes the bonding interface between a bond magnet section and a soft magnetic section, and the shearing stress is gradually increased to cause rupture.

Figure 12:
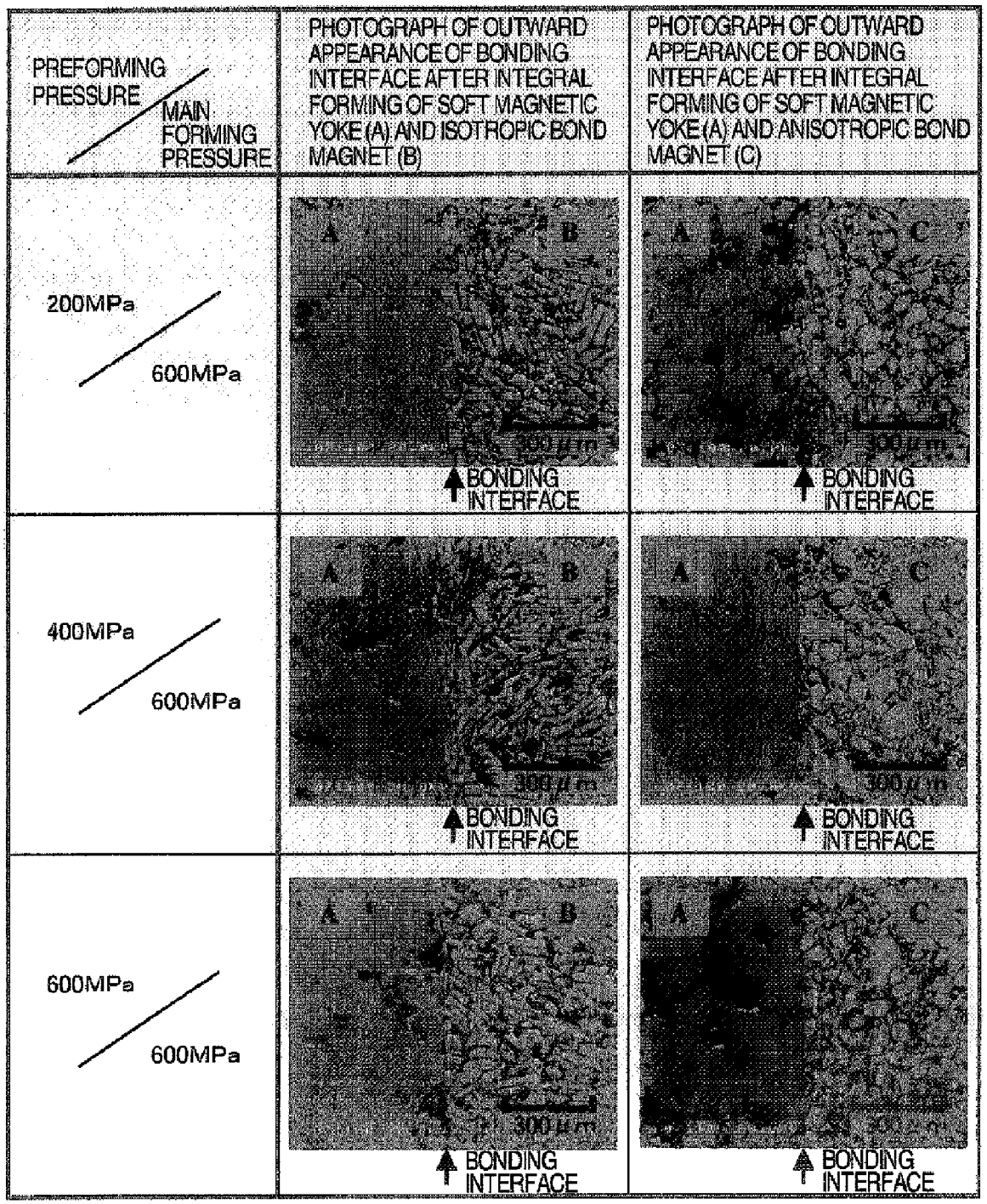
FIG. 12 is a view showing preforming pressure on a magnet and photographs of outward appearances of bonding interfaces in a pressure direction after integral forming with soft magnetic powder in the invention.
Figure 13:
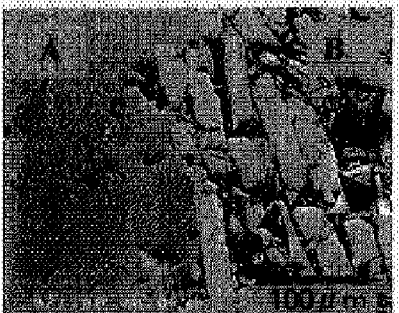
FIG. 13 shows enlargement of the photographs in FIG. 12.

Here, FIGS. 12 and 13 are photographs of outward appearances of bonding interfaces of cross sections of those integral formings in a pressure direction, which are obtained after main forming in the case where preforming pressure is changed. FIG. 13 shown further enlarged bonding interfaces of FIG. 12. Vertical directions in the photographs are pressure directions at the time of forming. As shown in FIGS. 12 and 13, it is observed in both isotropic bond magnets and anisotropic bond magnets that the lower preforming pressure, the more amounts of irregularities on bonding interfaces. In the case where preforming pressure and main forming pressure are equal to each other, little irregularities on bonding interfaces are recognized. FIG. 15(a) (in FIG. 15(a), i denotes shear strength of a bonding interface between an isotropic bond magnet and a soft magnetic yoke and ii denotes amounts of irregularities) shows the correlation between preforming pressure, and shear strength and amount of irregularities for isotropic bond magnets, and FIG. 15(b) (in FIG. 15(b), ii denotes amounts of irregularities on a bonding interface and iii denotes shear strength of a bonding interface between an anisotropic bond magnet and a soft magnetic yoke) shows the correlation between preforming pressure, and shear strength and amount of irregularities for anisotropic bond magnets. As shown in FIGS. 12 and 13, it is observed a manner, in which according to the invention, a large bonding force of 15 MPa or more is obtained by bringing about a state, in which magnet powder and soft magnetic powder bite each other in the vicinity of a bonding interface with an amount of irregularities in the order of 50 to 100 μm.

Figure 14:
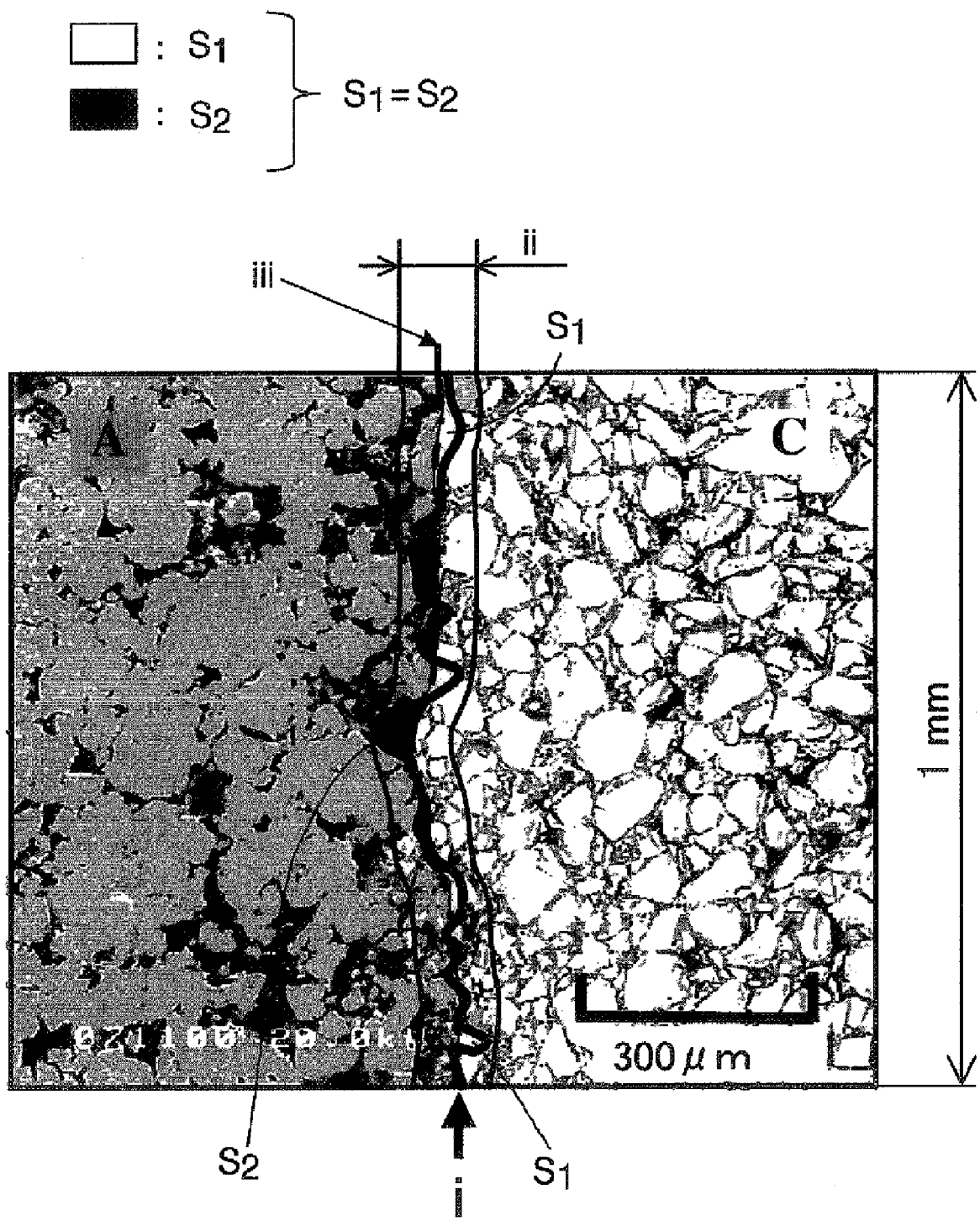
FIG. 14 shows photographs of a structure for illustration of a definition of an mount of irregularities on a bonding interface.

Amounts of irregularities of magnet powder and soft magnetic powder on a bonding interface will be described with reference to FIG. 14. On photographs of cross sections, a single curve can be drawn by connecting locations of contact between magnet powder and soft magnetic powder. The curve defines a bonding interface. A single curve is drawn in a manner to thread substantially centers of irregularities on a bonding interface. The curve is drawn so that areas surrounded by the curve and the bonding interface are equal to each other on the left and right of the curve, the curve being made a center line. The center line is translated to a position in contact with a maximum peak of the bonding interface. Translation is likewise made in an opposite direction. A spacing between two parallel lines drawn by translation makes an amount of irregularities. This work is performed in a visual field having a length of 1 mm on the bonding interface (In FIG. 14, i denotes a bonding interface, ii denotes irregularities on the bonding interface, iii denotes a center line, $S_1$ denotes an irregular area on a side of a bond magnet, and $S_2$ denotes an irregular area on a side of a soft magnetic yoke).

Figure 11:
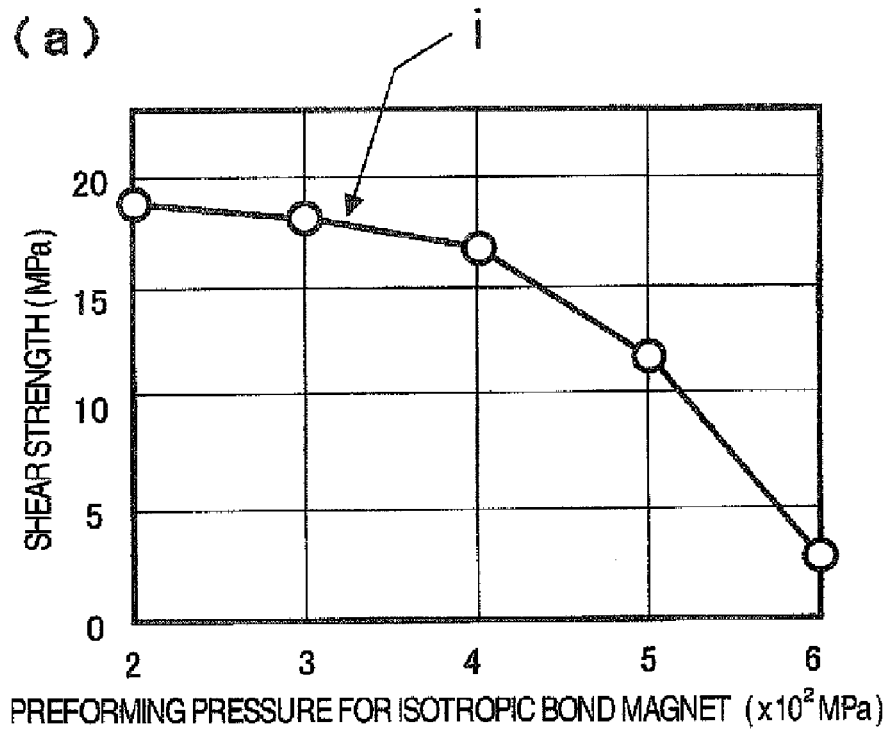
FIGS. 11 (a) and (b) is a view showing preforming pressure on a magnet and shear strength after integral forming with soft magnetic powder in the invention.
Figure 11:
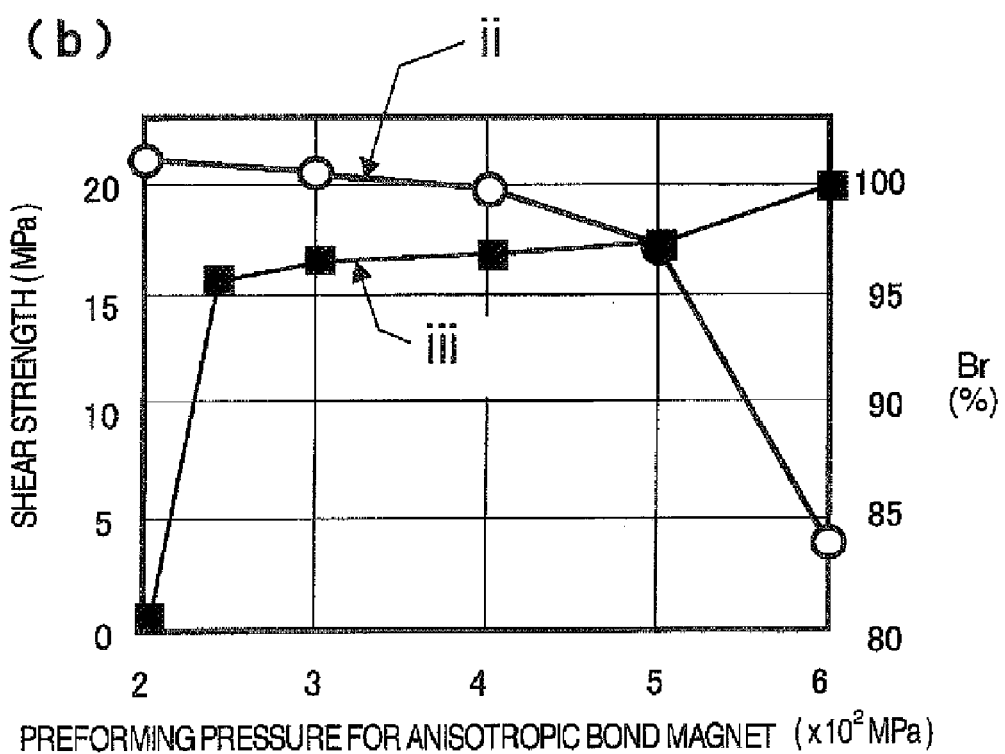
Figure 15:
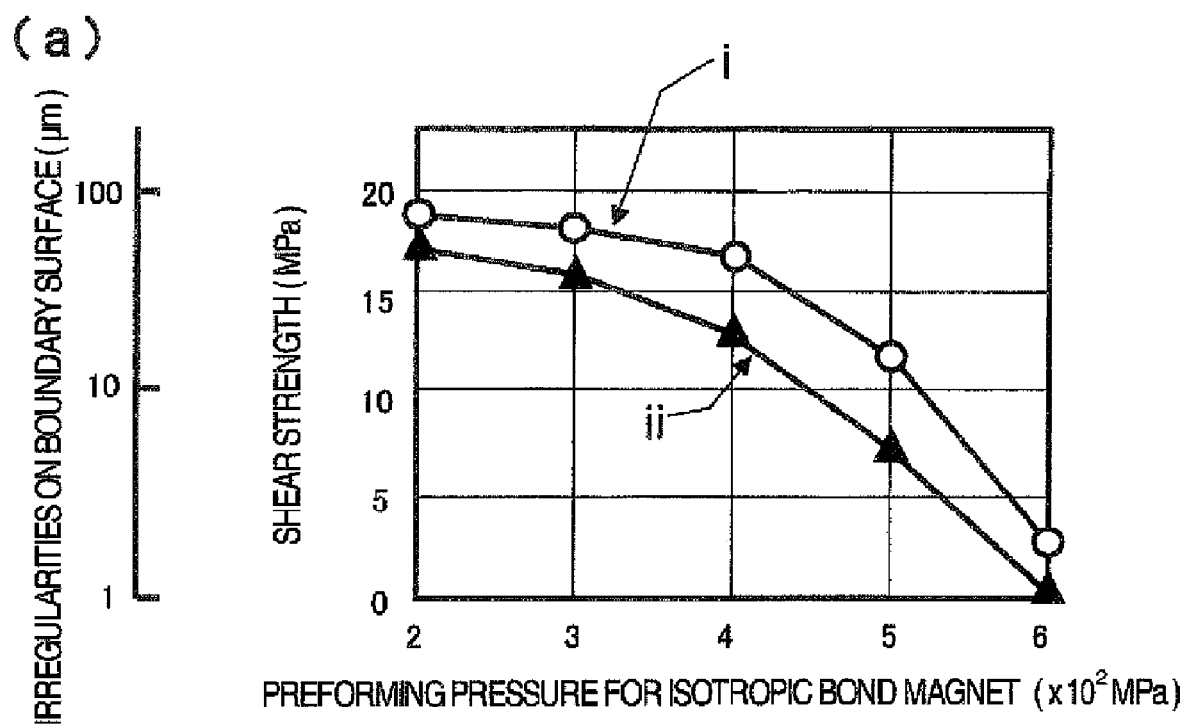
FIGS. 15 (a) and (b) is a view showing preforming pressure on a magnet, shear strength after integral forming with soft magnetic powder, and an mount of irregularities in the invention.
Figure 15:
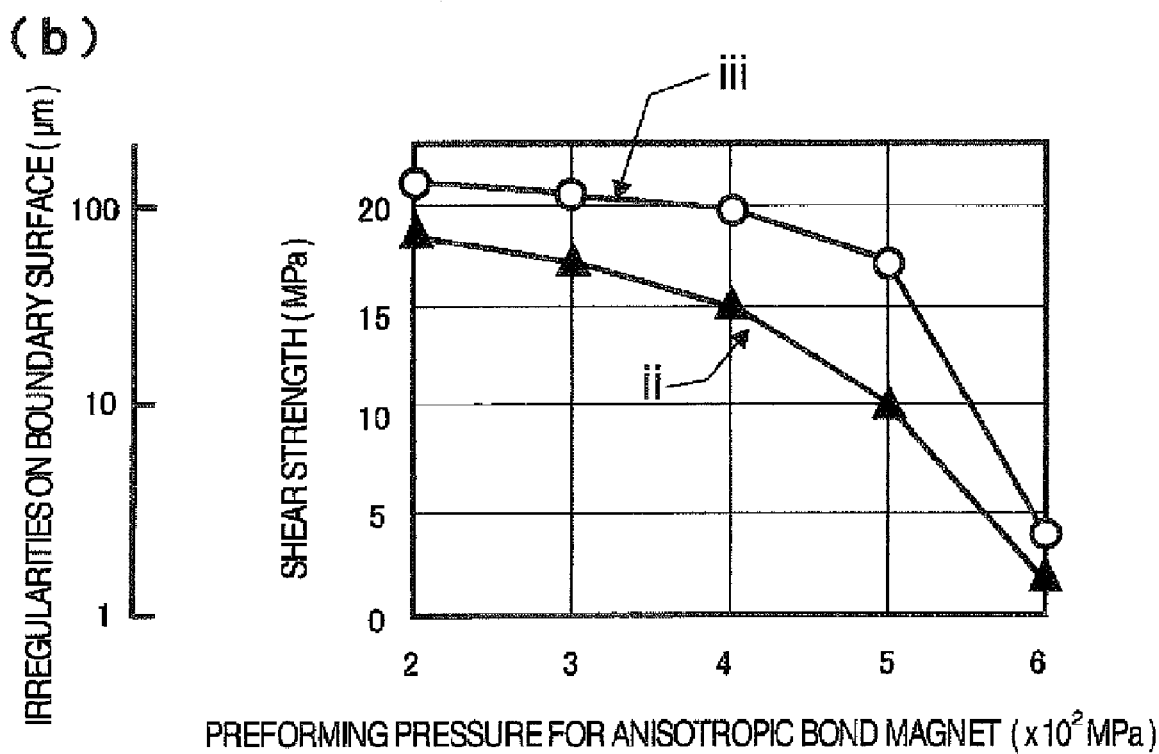
Figure 16:
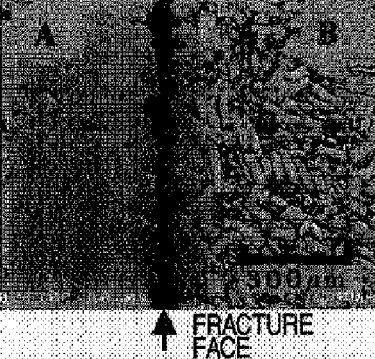
FIG. 16 shows photographs of a position of a fractured section when shear strength is found in FIG. 11.

While FIG. 11 shows the relationship between preforming pressure and shear strength on a bonding interface, FIG. 16 shows a position of a fractured section when the shear strength is found. When preforming pressure is 200 MPa and 400 MPa, rupture is generated in a position on a side of a bonding interface toward a soft magnetic yoke (A). Rupture is not generated on a bonding interface. In contrast, when preforming pressure was 600 MPa to be the same as main forming pressure, rupture was generated on the bonding interface. This phenomenon was the same even in the case where either of an isotropic bond magnet and an anisotropic bond magnet was used as a permanent magnet. A bonding interface itself is lower in shear strength than a soft magnetic yoke (A), an isotropic bond magnet (B), and an anisotropic bond magnet (C), respectively, in spite of preforming pressure. The reason why rupture is nevertheless generated on a side of the soft magnetic yoke (A) is thought in the following manner. A formed body released from main forming pressure is going to return slightly to an original state owing to the spring back phenomenon. Since at this time a magnitude, by which a bond magnet returns, is larger than a magnitude, by which a soft magnetic section returns, it is thought that tensile stress is generated in the vicinity of a bonding interface of the soft magnetic section. It is inferred that rupture is liable to occur in a position, in which tensile stress is generated. As shown in FIG. 15, since magnet powder and soft magnetic powder bite each other insufficiently on a bonding interface in the case where preforming pressure is the same as main forming pressure, rupture is generated on the bonding interface in spite of tensile stress.

In this manner, since a high bonding force is obtained between a bond magnet section and a soft magnetic section, it is possible to disuse a protective ring for structural reinforcement, which is essential in conventional bonding and integral forming systems (Patent Documents 1 and 2). Further, since a high pressing force in the invention is obtained in a whole region on the bonding interface 110 of a magnet and a soft magnetic yoke, a magnetic section is not limited to a ring shape and the soft magnetic yoke is held only by internal pressure of a ring magnet (Patent Documents 3 and 4). Like the bonding interface 110 of a magnet and a soft magnetic yoke, a high bonding force is also obtained on a bonding interface 100 of bond magnets by performing compression-forming at a higher pressure than preforming pressure.

According to the invention, since magnets can be oriented by one unit by one unit in a sufficient magnetic field in a process of preforming, it becomes possible to readily perform stable orientation and polarization irrespective of the number of magnetic poles, and dimensions of magnets. That is, as a method of manufacturing a component of a magnetic circuit composed of an anisotropic bond magnet section and a soft magnetic yoke section, it is possible to adopt a manufacturing method, in which the anisotropic bond magnet section is preformed in a magnetic field using magnet powder compound composed mainly of a binder agent and magnetic powder having an average particle size of 50 to 200 μm, then subjected to main forming in a manner to integrate with soft magnetic powder having an average particle size of 1 to 100 μm in nonmagnetic field, and heat cured. In addition, it is required that a metal mold for main forming use a material, such as cemented carbide, etc., in which importance is attached to mechanical strength characteristics rather than magnetic properties, so as to enable enduring high pressure of 500 to 1000 MPa, and be constructed with a thickness of some measure. Therefore, it becomes difficult to transmit a magnetic field by an electromagnet to a magnet formed section without waste. However, it is possible to adopt a steel material, in which importance is attached to magnetic properties and which is high in saturation magnetic flux density and high in relative permeability, for a metal mold material at preforming pressure in the order of 300 MPa, and to make the same small in thickness, so that it is possible to generate an oriented magnetic field, which is evenly distributed and high in intensity, in the magnet formed section. For example, in the case where a radially anisotropic ring magnet is to be oriented, a magnet, which is high in degree of orientation and involves small dispersion in magnetic intensity, can be obtained by performing orientation with a metal mold for preforming.

Figure 8:
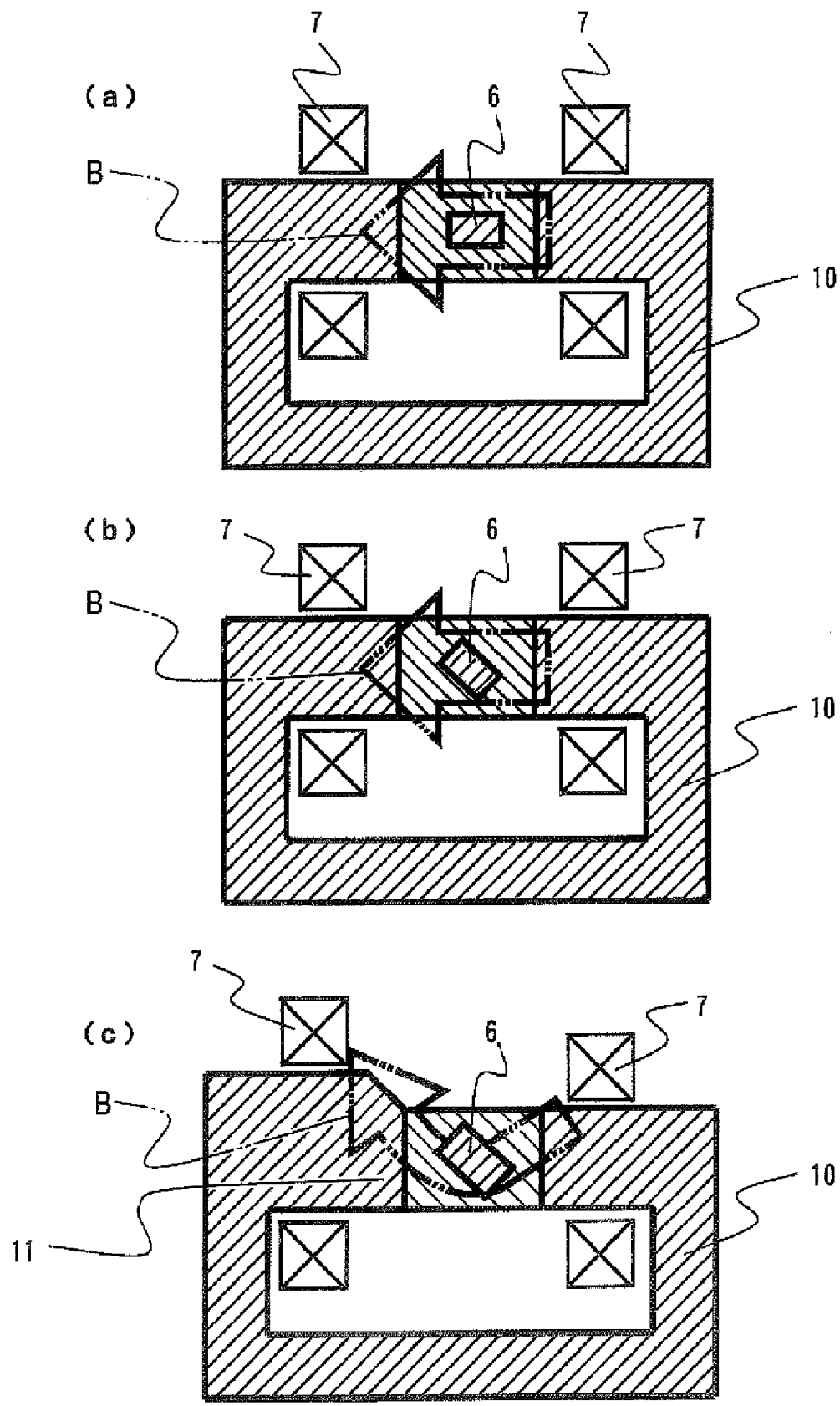
FIGS. 8 (a)-(c) is a cross sectional view schematically illustrating a method of applying a magnetic field at the time of preforming in the invention.

A preforming press in the order of 300 MPa is compact in terms of manufacturing facility as compared with a main forming press and so it is possible to select a material, in which importance is attached to magnetic properties, in contrast to a material, which constitutes the press. Also, as shown in FIG. 8(a) (in the drawing, an arrow B indicate a direction of a magnetic field), the press is advantageous in terms of magnetic field orientation as compared with a conventional forming machine shown in FIGS. 5 and 6 because it is possible to constitute a closed, magnetic path connected by a back yoke and to arrange electromagnets near to magnet powder.

In this manner, various patterns of magnetization can be realized by forming a magnetic circuit from a material, which is high in relative permeability μ and saturation magnetic flux density Bs. For example, as shown in FIG. 8(b) (in the drawing, an arrow B indicate a direction of a magnetic field), an axis of easy magnetization of a magnet can be arranged in a free direction by inclining a die cavity, in which a magnet is subjected to forming under compression, to a uniform, parallel, magnetic field. Also, as shown in FIG. 8(c) (in the drawing, an arrow B indicate a direction of a magnetic field), an axis of easy magnetization can also be bent by contriving a shape of a yoke tip end and arrangement of electromagnets. Alternatively, further complex control of an oriented magnetic field can be exercised by contrivance such as forming a complex magnetic path on a metal mold for preforming of a magnet and having a permanent magnet functioning as a sub-magnetic path.

In the case where forming under compression is performed at high pressure of 500 to 1000 MPa in a final process of manufacture, for example, the density is 5.5 to 6.5 Mg/m$^3$ for a R—Fe—B bond magnet section, 5.3 to 6.2 Mg/m$^3$ for a R—Fe—N bond magnet section, and 6.0 to 6.8 Mg/m$^3$ for a bond soft magnetic section of Fe powder.

Figure 1:
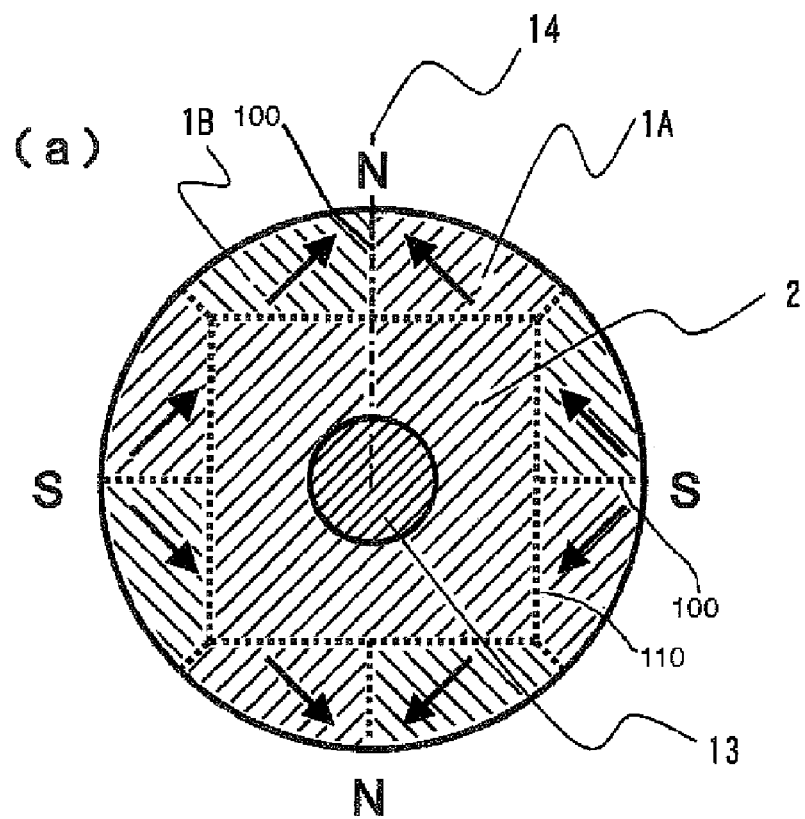
FIG. 1 is a cross sectional view schematically showing a surface permanent magnet type permanent magnet rotor (a) according to an embodiment of the invention and a surface permanent magnet type permanent magnet rotor (b) being of a combined reluctance effect type.
Figure 1:
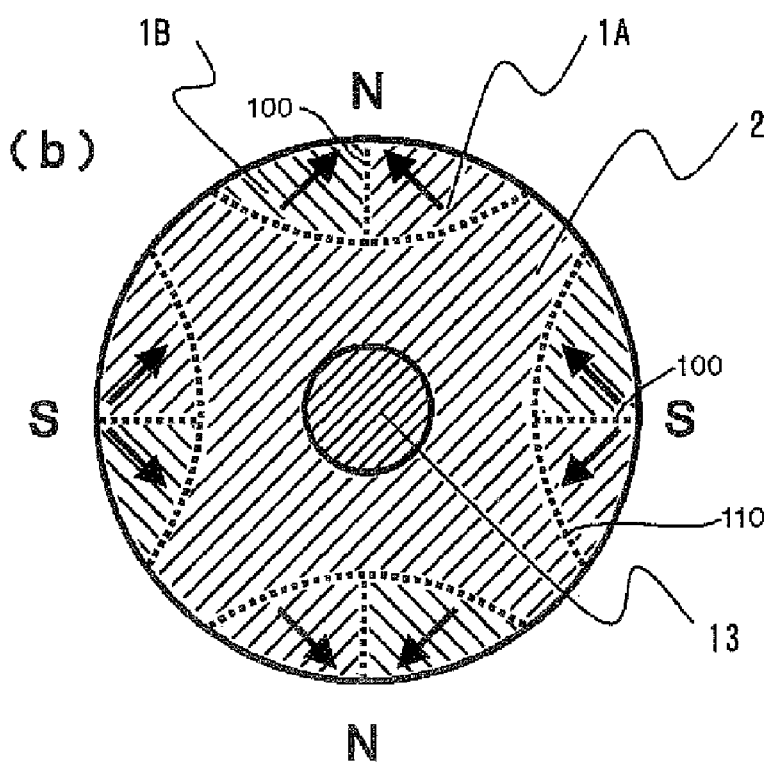
Figure 2:
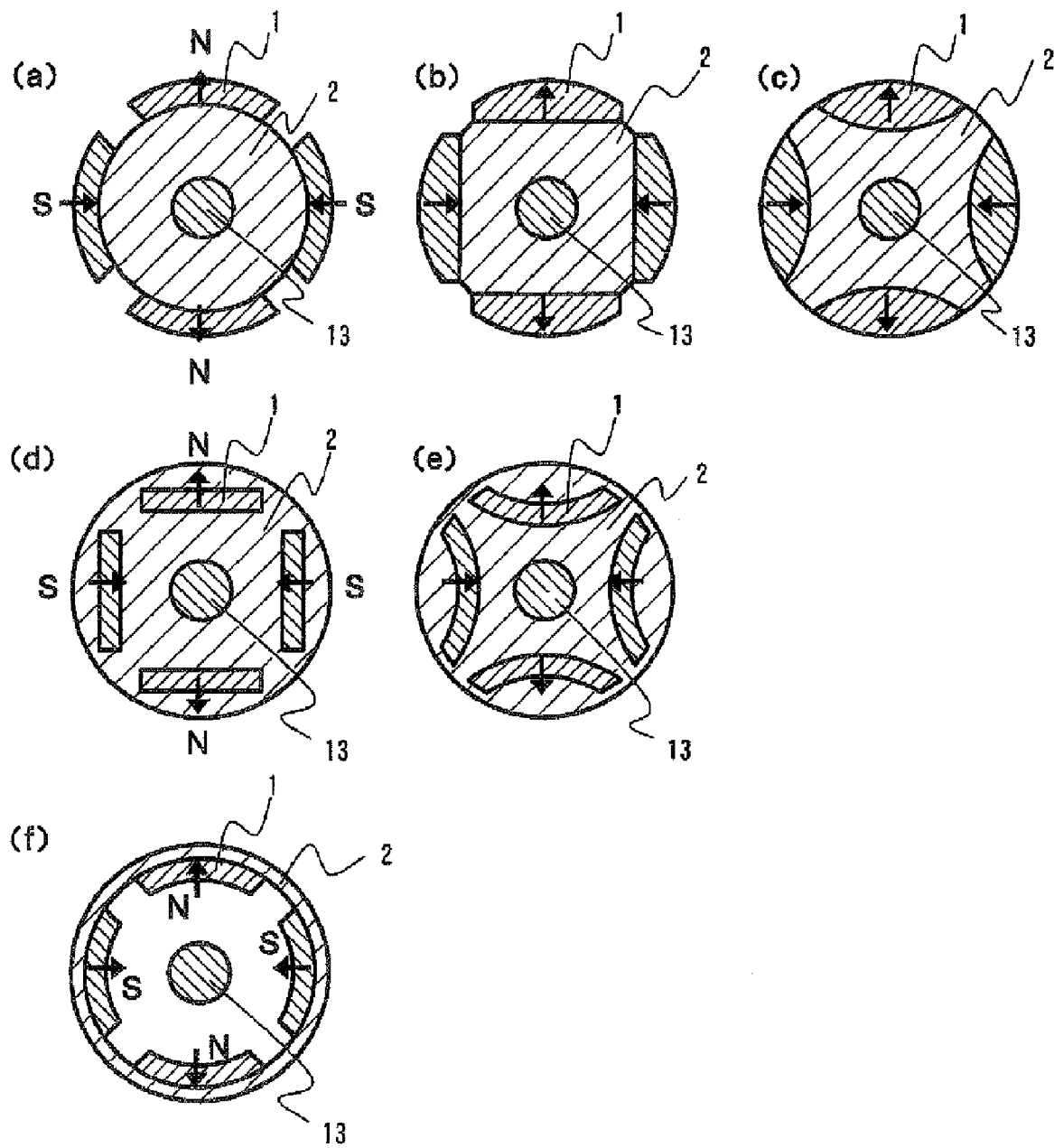
FIG. 2 (a)-(f) is a cross sectional view schematically illustrating a system of a conventional, permanent magnet rotor.
Figure 3:
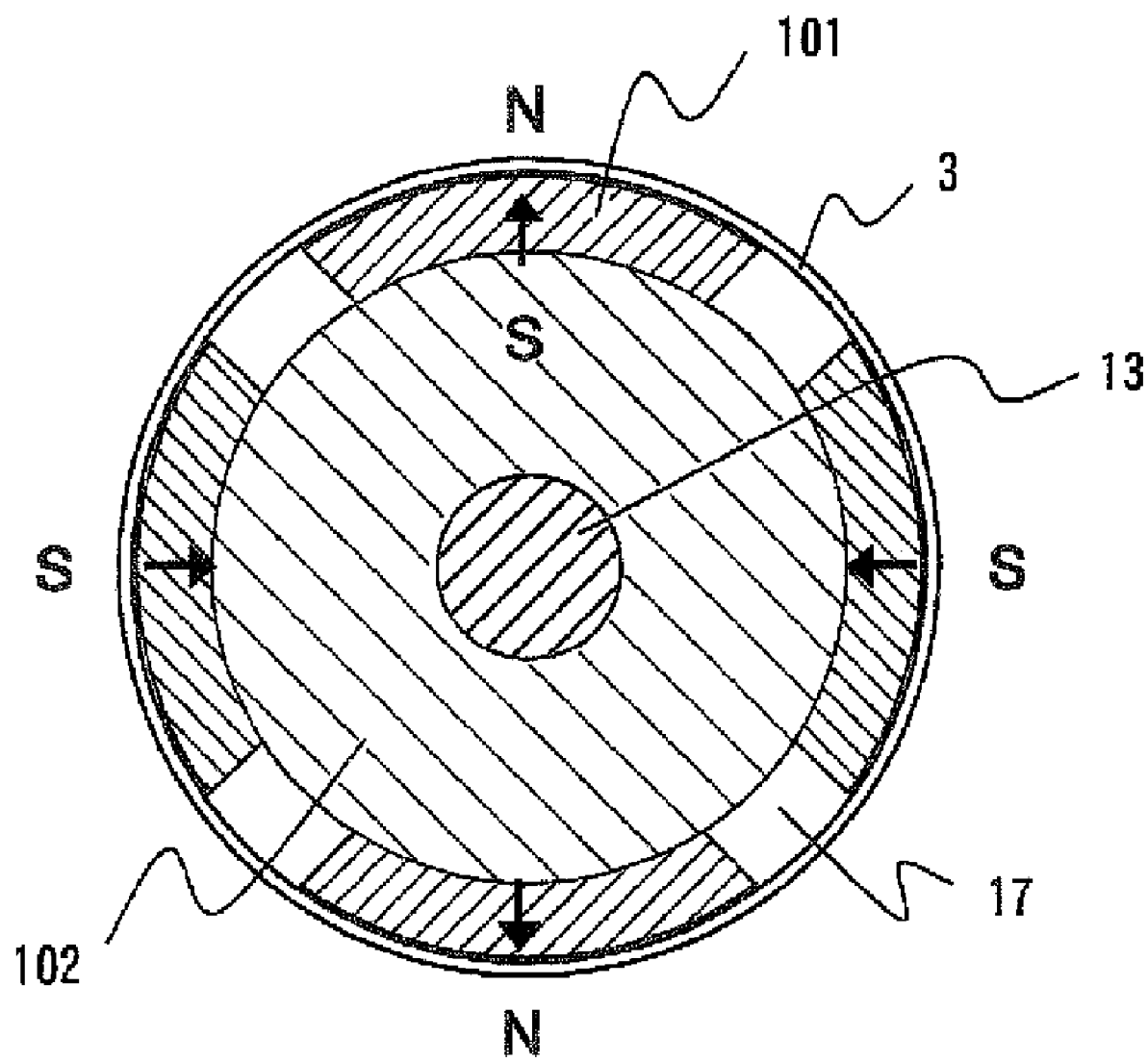
FIG. 3 is a cross sectional view schematically illustrating a surface permanent magnet type permanent magnet rotor of Comparative example.

It is impossible in conventional techniques shown in FIGS. 5 and 6 to manufacture a rotor mounting thereon a multiplicity of permanent magnets, which are complex in shape and orientation, as shown in FIG. 1, but manufacture becomes possible with the use of the manufacturing method of the invention. As shown in FIG. 1, in the case where an anisotropic magnet body is formed by linking magnet units, of which magnetic poles are formed by bonding a pair of permanent magnets 1A, 1B together so that directions of magnetization thereof become symmetric with respect to the bonding interface 100, so that magnetic poles of different polarities are generated alternately on a magnetic action surface, high characteristics are expected. That is, as compared with the case where one magnetic pole is constituted by a single magnet shown in FIG. 2, generated magnetic fields are efficiently concentrated in a center position of the magnetic poles. Concentration of generated magnetic fields is preferable at an angle θ shown in FIG. 9, that is, at an inclination of a bonding interface of 5 to 35° to a diametric direction. In particular, the range of 20°±10° is more preferable (In FIG. 9, induced voltage is standardized in Comparative example (a conventional system: FIG. 3).

Effect of the Invention

According to the invention, a magnet rotor, in which bonding strength is high between a magnet section and a soft magnetic yoke section and structural reliability is high even in high speed use, can be provided by integral forming of a rotor from bond magnet powder, which contains a binder agent such as resin binder, etc., and soft magnetic powder. Also, the manufacturing process of forming under compression is separated into preforming at low pressure and main forming at high pressure and axes of easy magnetization of magnets are arranged in a necessary, magnetic field in the process of preforming, so that it is possible to obtain a magnetic rotor, which is stable and small in pole pitch and dispersion of magnetic intensity, irrespective of the number of magnetic poles and dimensions of a rotor. Further, not only radial polarization and polar anisotropic polarization but also polarization, in which a single magnetic pole is substantially parallel up to both ends, and further complex polarization, can be controlled, and a magnetic pole pattern, which is difficult to realize in the related art, can be formed on a magnet rotor to contribute to making a motor high in output and efficiency.

BEST MODE FOR CARRYING OUT THE INVENTION

An embodiment of a motor, in which a permanent magnet rotor according to the invention is used, will be described below with reference to the drawings. In addition, reference numerals in the drawings will be described in the end of the present specification.

Embodiment 1

Comparative Example 1

First, an explanation will be given to an importance in the relative, positional relationship between left and right imaging elements in a stereo camera. First, effects of making the most of that high bonding strength between a bond magnet section and a soft magnetic yoke section, which constitutes a feature of a manufacturing method of the invention, to cancel a protective ring have been examined. A protective ring as shown in FIG. 3 is essential in a conventional system (Comparative example 1), in which segment magnets are bonded. In contrast, when a rotor (FIG. 1(a)) fabricated by the manufacturing method of the invention is used, a rare-earth bond magnet section and a soft magnetic yoke section made of soft magnetic powder can be unified firmly, so that a protective ring is dispensed with and a gap between a stator and a rotor can be made small, thus enabling making further effective use of magnetic flux than in Comparative example 1. Also, a decrease in output, which accompanies an eddy current loss in a protective ring over a high frequency region, can also be avoided. Further, since processes of bonding and assembly are unnecessary, manufacture with a lower cost than conventional is possible.

Epoxy resin as a binding material was added to magnetic powder by 3 mass % and to soft magnetic powder by 1.1 mass %. As a magnet material, Nd sintered magnet (Br=1.3 T) was used in Comparative example 1 and Nd anisotropic bond magnet (Br=0.9 T) was used in Embodiment 1. A rotor outside diameter was 50 mm, and a bond magnet section 1 had a thickness of 10 mm in a direction of magnetization and a length of 20 mm in a direction along an axis of rotation. Also, a Ti protective ring having a thickness of 0.3 mm was used in Comparative example 1.

TABLE 1 is one representative of the relationship between induced voltage and rotating speed of a motor for the both rotors. Here, a value of voltage at 1000 rpm (number of revolution per minute) in Comparative example 1 assumes 100%.

TABLE 1

| Number of revolutions | Induced voltage (%) | |
|---|---|---|
| (rpm) | Embodiment 1 | Comparative example 1 |
| 1000 | 96 | 100 |
| 5000 | 480 | 495 |
| 10000 | 960 | 980 |
| 20000 | 1920 | 1920 |

Although Embodiment 1 is 30% lower in residual magnetic flux density (Br) than Comparative Example 1, it is possible to narrow an effective air gap corresponding to the absence of a protective ring, so that reduction in induced voltage at 1000 rpm is limited to 4%. Also, while induced voltage increases substantially in proportion to the number of revolutions, mainly an eddy current loss in a protective ring portion in Comparative example 1 becomes conspicuous as rotation is increased in speed, and generated voltage is lowered from a proportional straight line. On the other hand, with Embodiment 1, there is obtained induced voltage, which is substantially proportional to the number of revolutions up to 20000 rpm.

With Embodiment 1, there is not caused a problem of breakage of a magnet, separation of bonding of a magnet section and a soft magnetic section, etc. in the number of revolutions up to 20000 rpm. When structural reliability to a centrifugal force is simulated with the finite element method, a safety factor of about 5 times is met at 20000 rpm.

Embodiment 2

FIG. 1 is a cross sectional view schematically showing a permanent magnet rotor according to a further embodiment of the invention. In FIG. 1, one magnetic pole is constituted by two magnets 1A, 1B, a yoke 2 made of a soft magnetic material, and a shaft 13. According to the manufacturing method of the invention, it is possible to mount a multiplicity of permanent magnets, which are complex in shape and orientation. As shown in FIG. 1, when anisotropic bond magnets 1A, 1B are oriented so that directions of magnetization of magnets indicated by arrows are made symmetrical with respect to a bonding interface 100 of the anisotropic bond magnets 1A, 1B, generated magnetic fields are efficiently concentrated in a center position of the magnetic poles shown by N(S) in the drawing, and high magnetic properties can be obtained as compared with the case where one magnetic pole is constituted by a single magnet shown in FIG. 2. An extent, to which generated magnetic fields are concentrated, is related to an inclination of magnetization. A magnetic material, dimensions, etc. are under the same condition as in Embodiment 1.

Figure 9:
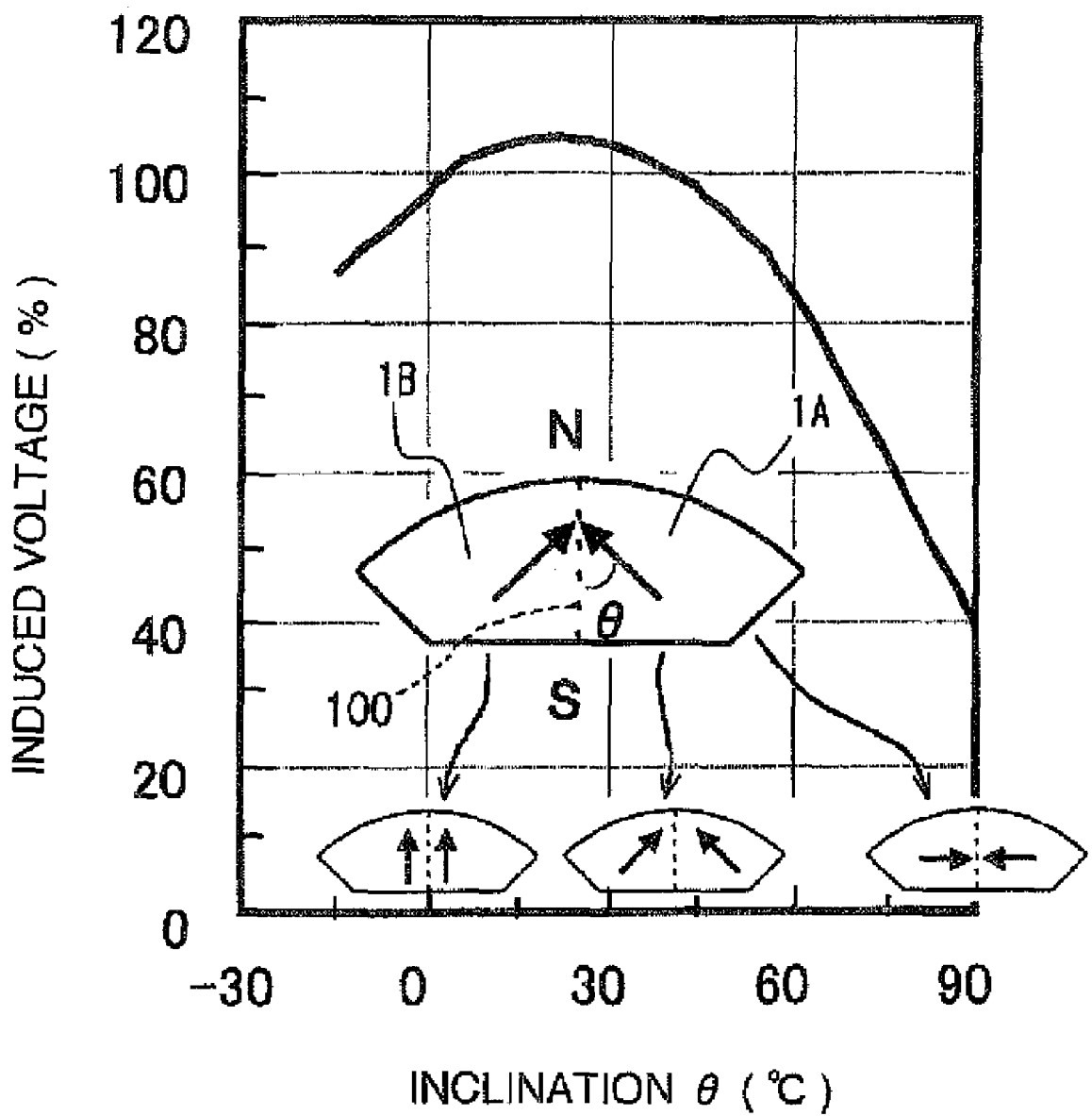
FIG. 9 is a view showing a voltage-magnetization inclination representing results of measurement of induced voltage according to a further embodiment of the invention.

FIG. 9 is a view illustrating the relationship between induced voltage and inclination with respect to Embodiment 2. Here, a value of induced voltage at 1000 rpm in Comparative example 1 is standardized to assume 100%. It is found in FIG. 9 that higher motor characteristics than that in Comparative example 1, which resorts to a conventional segment bonding system, can be obtained by adopting a structure as shown in FIG. 1. It is found in FIG. 9 that in order to improve the voltage, an inclination ranges preferably in 5 to 40°, more preferably 5 to 35°, and especially preferably 20°±10°. Also, generated voltage substantially proportional to the number of revolutions up to 20000 rpm is obtained in Embodiment 2, and thus it is found from TABLE 1 that a structure, which is further advantageous in high speed rotation, is provided.

Embodiment 3

Figure 10:
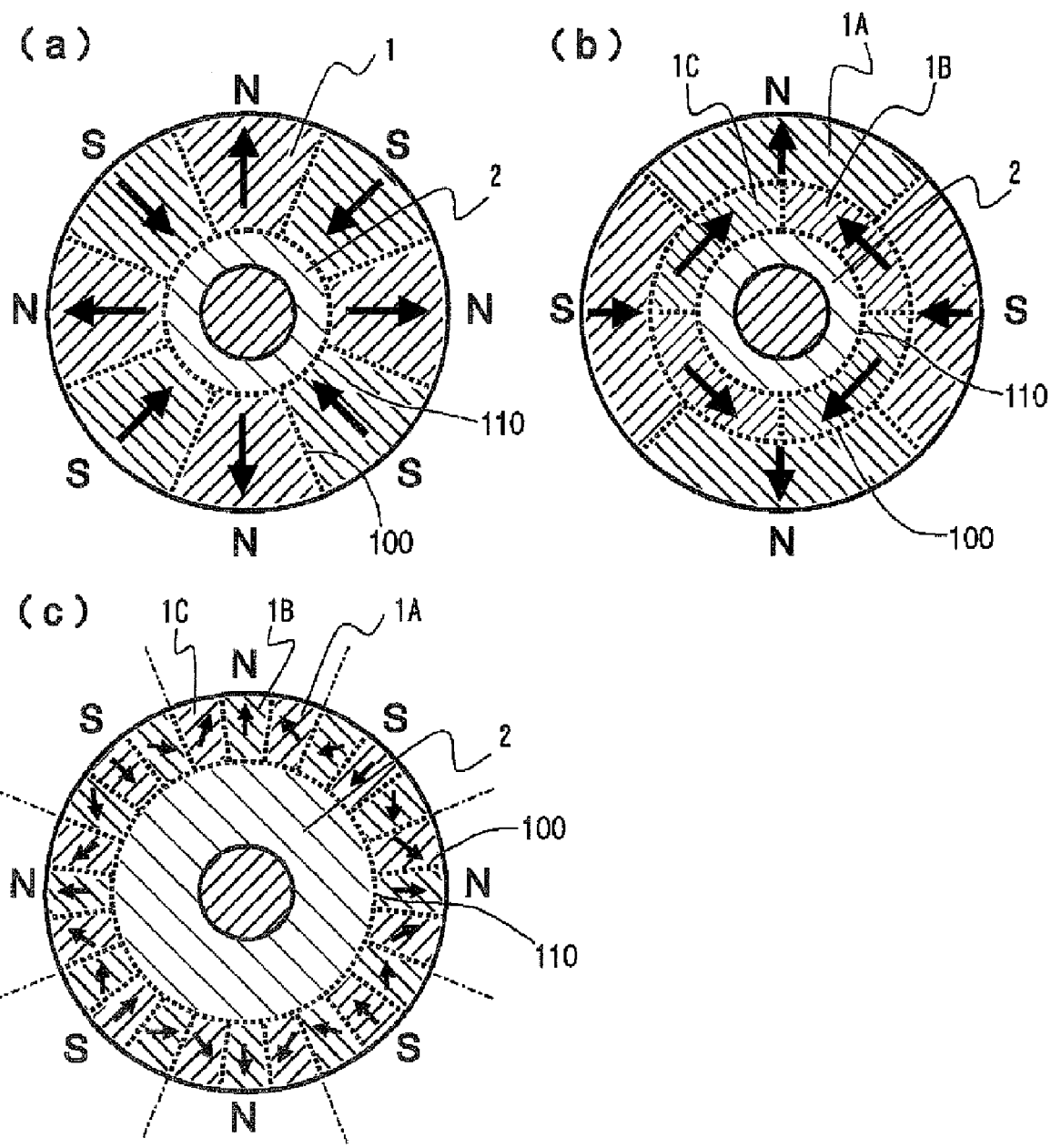
FIGS. 10 (a)-(c) is a cross sectional view schematically showing a permanent magnet rotor according to a further embodiment of the invention.

FIG. 10 is a cross sectional view schematically showing a permanent magnet rotor according to a further embodiment of the invention. With a conventional ring magnet manufacturing method, although a magnet has a large thickness in a direction of magnetization as shown in FIG. 10(a), orientation and orientation of multiple poles are difficult, but stable orientation and polarization can be readily performed irrespective of the number of poles and dimensions of a magnet in the manufacturing method of the invention. Also, as shown in FIGS. 10(b) and 10(c), it is also possible to compose one pole of three magnets 1A to 1C to efficiently concentrate generated magnetic fields in a center position of magnetic poles.

Embodiment 4

Figure 17:
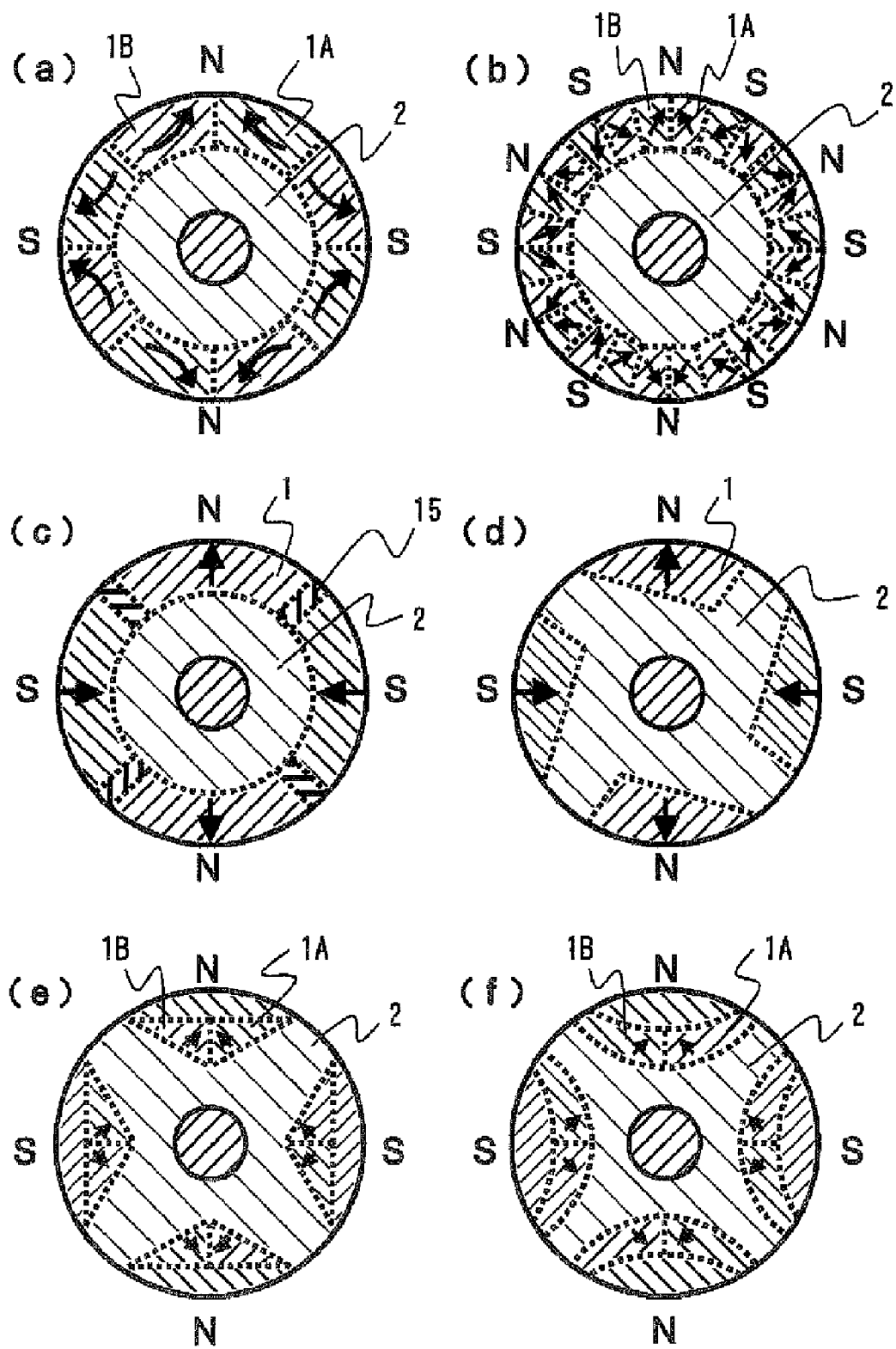
FIGS. 17 (a)-(f) is a cross sectional view schematically showing a permanent magnet rotor according to a further embodiment of the invention.

FIG. 17 is a cross sectional view schematically showing a permanent magnet rotor according to a further embodiment of the invention. FIG. 17(a) shows an embodiment of polar anisotropic polarization of four poles, in which magnets, of which axes of easy magnetization are bent with the use of a magnetic field orientation apparatus shown in FIG. 8(c), are combined to be made integral with a soft magnetic yoke. FIG. 17(b) shows an embodiment of twelve poles of a pole concentration type, in which one magnetic pole is composed of two magnets 1A, 1B. In this manner, a magnet rotor of multiple poles can be readily realized by combining a plurality of preformed magnets and soft magnetic powder to integrate them. FIG. 17(C) shows an embodiment, in which non-magnetic compounds 15 are interposed between a magnet 1 and a magnet 1 to be integrated with a soft magnetic yoke 2. FIG. 17(d) shows an embodiment, in which a thickness of a magnet in a direction of magnetization is varied in a circumferential direction. FIGS. 17(e) and 17(f) show embodiments of a magnet embedded type. In this manner, it is possible according to the invention to readily realize a rotor, in which a magnet is complex in shape and in a direction of magnetization.

Reference numerals in the drawings denote the following contents.

1, 1A to 1C: bond magnet
2: soft magnetic section
3: protective ring
4: punch for forming under compression
5, 5A, 5B: metal mold
6: magnetic powder
7: electromagnet
8: soft magnetic powder
9: heat curing furnace
10: back yoke (magnetic body)
11: yoke tip end
12: soft magnetic body or magnet
13: shaft (motor rotating shaft)
14: diametric direction
15: nonmagnetic body 16: flat portion
17: air gap
100: bonding interface of bond magnet sections
101: segment magnet
102: soft magnetic yoke
110: bonding interface of bond magnet section and soft magnetic section

INDUSTRIAL APPLICABILITY

A bond magnet rotor for a motor, integrated with a soft magnetic yoke is provided.

The invention claimed is:

1. A rotor for a motor, comprising a magnet section having a magnet powder and a soft magnetic yoke section having a soft magnetic powder, the magnet section and the soft magnetic yoke section being formed integrally together so that the magnet powder and the soft magnetic powder engage with each other on mutual bonding interfaces thereof by simultaneously pressurizing the magnet section and the soft magnetic yoke section in a direction parallel to the mutual bonding interfaces, wherein the magnet section comprises a plurality of anisotropic bond magnets each orientated in a single magnetic direction composed mainly of the magnet powder and a binder agent, and the soft magnetic yoke section is composed mainly of the soft magnetic powder and a binder agent.

2. The rotor for a motor according to claim 1, wherein magnet units each constituted, such that a plurality of the anisotropic bond magnets are combined to form a single magnetic pole, are linked so that magnetic poles of different polarities appear alternately on a magnetic action surface.

3. The rotor for a motor according to claim 1, comprising magnet units each having a magnetic pole composed by bonding a pair of permanent magnets, of which easy magnetization directions are inclined to a bonding interface thereof, and in which the easy magnetization directions are arranged symmetrically to each other with respect to the bonding interface, wherein the magnet units are linked with one another such that magnetic poles of different polarities appear alternately on a magnetic action surface, and wherein each of the easy magnetization directions of the permanent magnets has an inclination to a radial direction along the bonding interface.

4. The rotor for a motor according to claim 3, wherein the inclination is an angle of 5 to 40°.

5. The rotor for a motor according to claim 3, wherein a bonding interface of the bond magnet section and the soft magnetic section has a shear strength of 10 MPa or more.

6. The rotor for a motor according to claim 1, wherein a bonding interface of the bond magnet section and the soft magnetic section has a shear strength of 10 MPa or more.

7. A component of a magnetic circuit, comprising a magnet section having a magnet powder and a soft magnetic yoke section having a soft magnetic powder, the magnet section and the soft magnetic yoke section being formed integrally together so that the magnet powder and the soft magnetic powder engage with each other on mutual bonding interfaces thereof by simultaneously pressurizing the magnet section and the soft magnetic yoke section in a direction parallel to the mutual bonding interfaces, wherein the magnet section comprises a plurality of anisotropic bond magnets each orientated in a single magnetic direction composed mainly of the magnet powder and a binder agent, and the soft magnetic yoke section is composed mainly of the soft magnetic powder and a binder agent.

8. A rotor for a motor, comprising a bond magnet section composed mainly of magnet powder and a binder agent, and a soft magnetic yoke section composed mainly of soft magnetic powder and a binder agent, the bond magnet section and the soft magnetic yoke section being formed integrally by forming under compression, and the magnet powder and the soft magnetic powder engaging with each other on mutual bonding interfaces thereof by simultaneously pressurizing the magnet section and the soft magnetic yoke section in a direction parallel to the mutual bonding interfaces, wherein a position of a fractured section formed when shear strength of the bonding interfaces is to be examined exists in a side of the soft magnetic yoke.

9. A component of a magnetic circuit, comprising a bond magnet section composed mainly of a magnet powder and a binder agent, and a soft magnetic yoke section composed mainly of a soft magnetic powder and a binder agent, the bond magnet section and the soft magnetic yoke section being formed integrally by forming under compression, and the magnet powder and the soft magnetic powder engaging with each other on mutual bonding interfaces thereof by simultaneously pressurizing the magnet section and the soft magnetic yoke section in a direction parallel to the mutual bonding interfaces, wherein a position of a fractured section formed when shear strength of the bonding interfaces is to be found is on a side of the soft magnetic yoke.

* * * * *